United States Patent [19]
Bull et al.

[11] 3,947,875
[45] Mar. 30, 1976

[54] MAGNETIC RECORDER TEST ARTICLE AND METHODS

[75] Inventors: Frederick W. Bull; Richard A. Leavitt; Robert L. Weiss, all of Longmont, Colo.

[73] Assignee: International Business Machines Corporation, Armonk, N.Y.

[22] Filed: Aug. 6, 1974

[21] Appl. No.: 495,164

[52] U.S. Cl. .................. 360/39; 360/25; 360/31
[51] Int. Cl.² ........................................ G11B 5/09
[58] Field of Search ............ 360/84, 25, 31, 39, 53, 360/55

[56] References Cited
UNITED STATES PATENTS

| | | | |
|---|---|---|---|
| 3,436,652 | 4/1969 | Asztalos | 324/57 |
| 3,463,878 | 8/1969 | Nassimbene | 360/84 |
| 3,506,814 | 4/1970 | McDonald et al. | 235/153 |
| 3,686,682 | 8/1972 | Behr et al. | 360/75 |
| 3,711,691 | 1/1973 | Breitenbach | 235/153 A |
| 3,846,831 | 11/1974 | Johnson, Jr. et al. | 360/84 |
| 3,864,739 | 2/1975 | Jackson | 360/84 |

Primary Examiner—Vincent P. Canney
Attorney, Agent, or Firm—Herbert F. Somermeyer

[57] ABSTRACT

An improved magnetic tape test article includes a plurality of longitudinally spaced-apart test sections. Some of the test sections are repeated to facilitate recorder tests under different tape wrap conditions. One of the tests is a compound test enabling several simultaneous measurements of several parameters of the recorder. The tests are particularly adaptable for helical scan digital signal recorders. The tests measure parameters such as head to medium spacing, tracking (skew, servo offset and the like), readback circuit performance, including clocking, phase tolerances, error detection and correction operations, response to dropouts, resynchronization response and amplitude tolerances. Profile of the spacing between the record medium and the head is measured over the length of the recorded path around the cylindrical mandrel.

36 Claims, 28 Drawing Figures

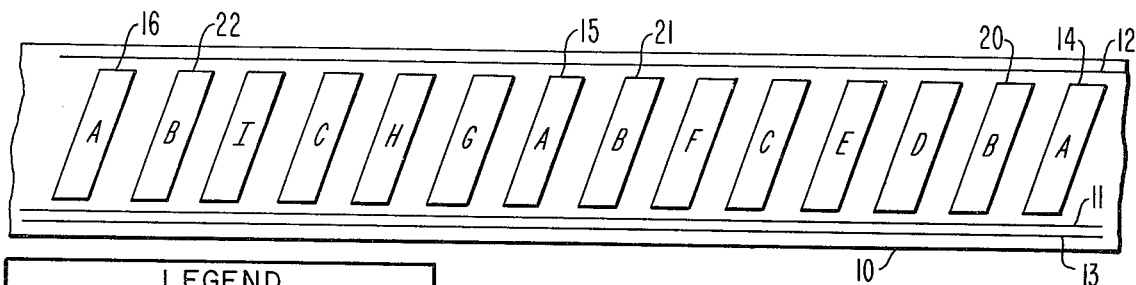
FIG. 1
| LEGEND | | |
|---|---|---|
| TEST SECTION | TITLE | FIG. |
| A | TRACKING TEST | 3 |
| B | COMPOUND TEST | 4 |
| C | HEAD SPACING TEST | 5 |
| D | PEAK SHIFT TEST | 6 |
| E | DROPOUT TEST | 7 |
| F | CLOCKING TEST | 8,9 |
| G | RESYNC TEST | 10 |
| H | ERROR POINTER TEST | -- |
| I | ERROR ARRAY FOR ECC TEST | 11 |
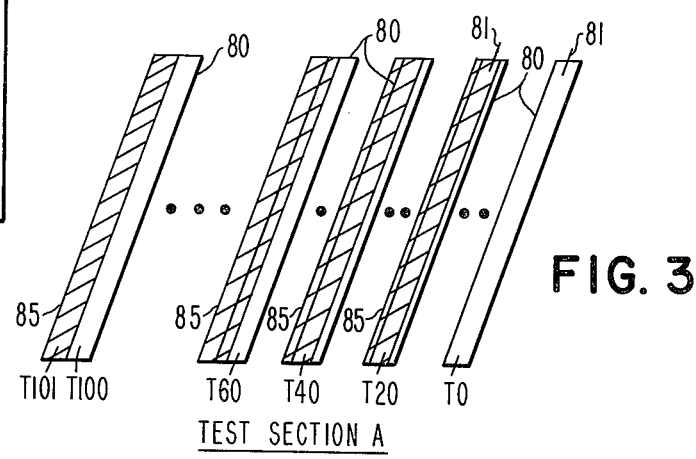
FIG. 3
TEST SECTION A
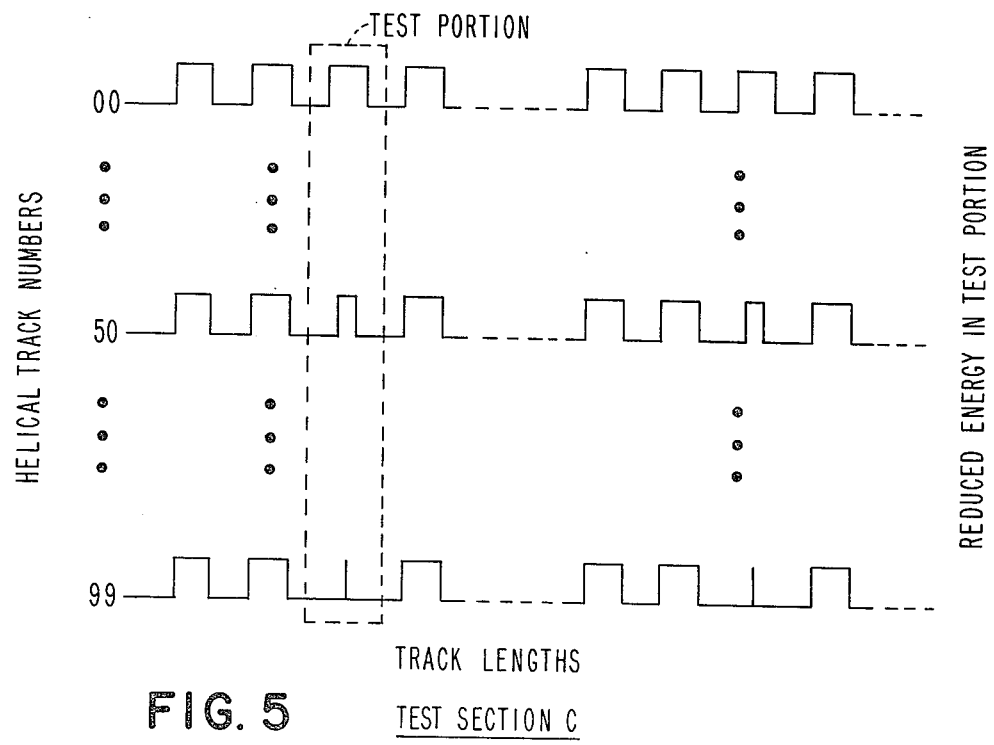
FIG. 5    TEST SECTION C

FIG. 3A

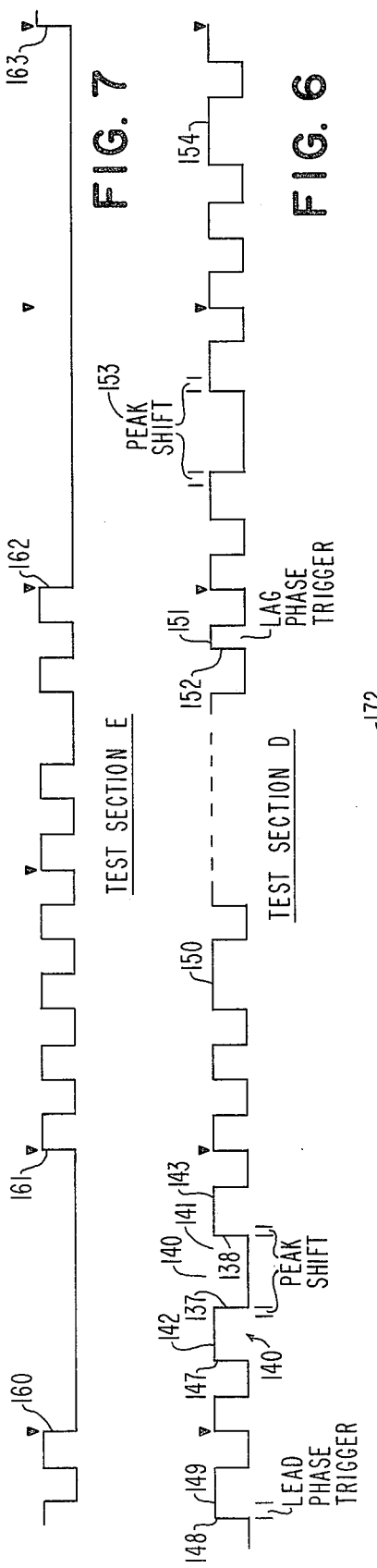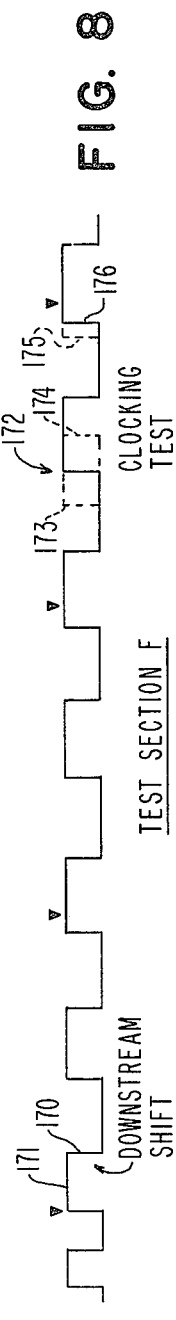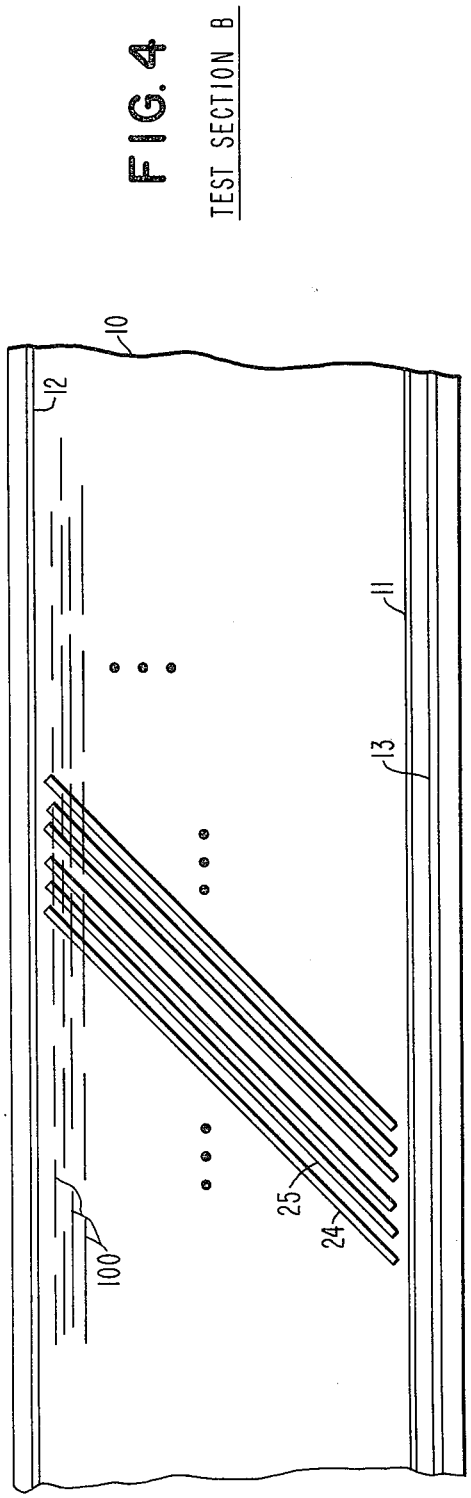

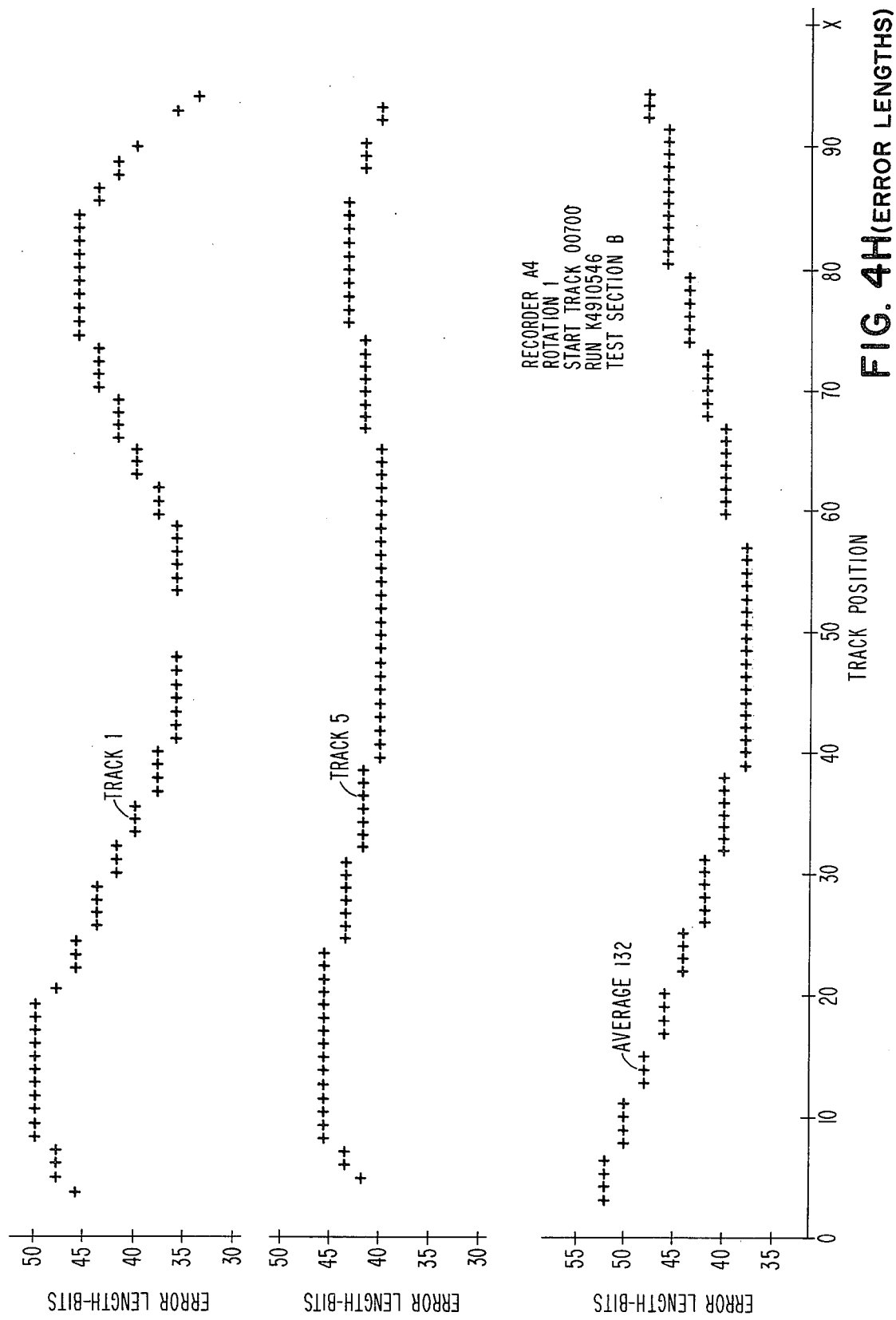

FIG. 6A
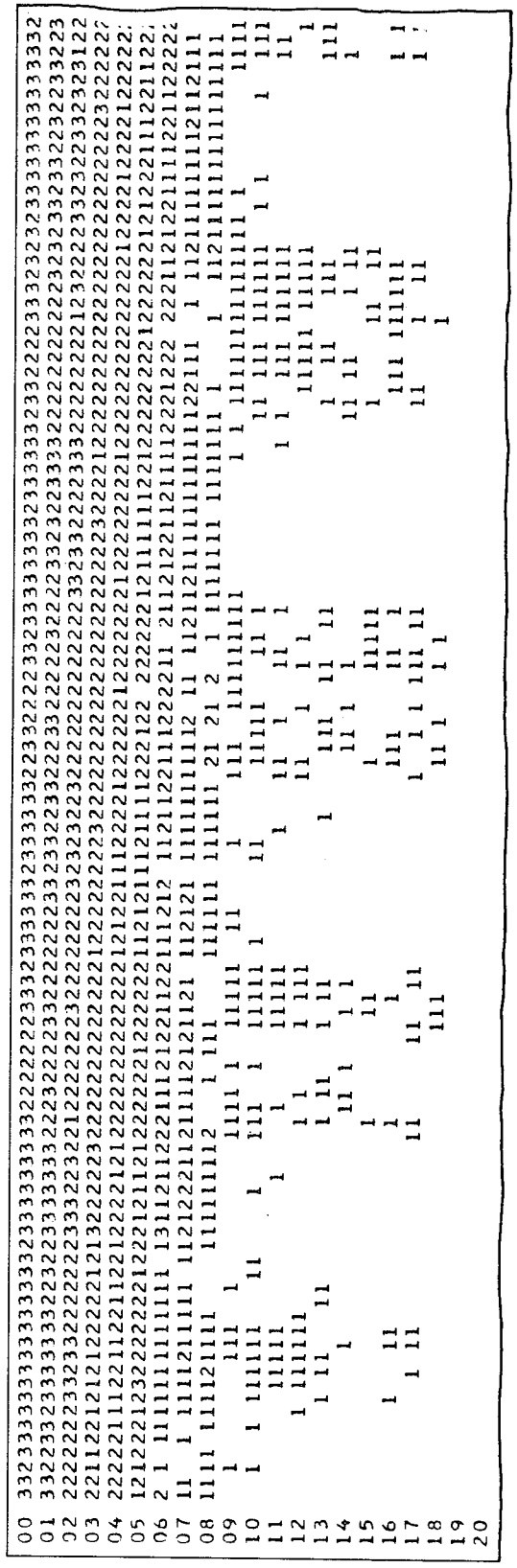
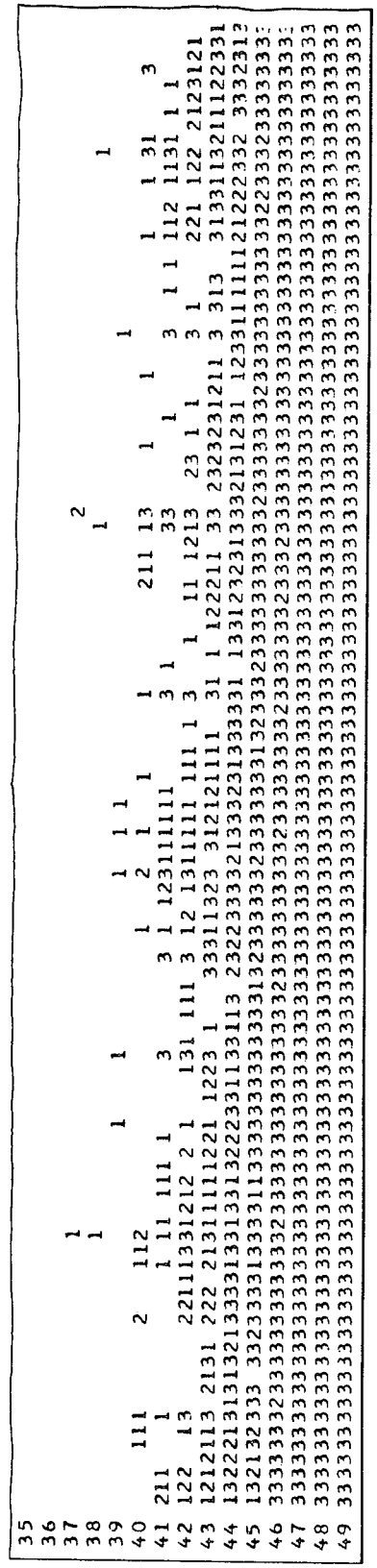
RELATIVE HELICAL TRACK NUMBER
ERRORS PER TEST BYTE GROUP ALONG TRACKS

FIG. 7A

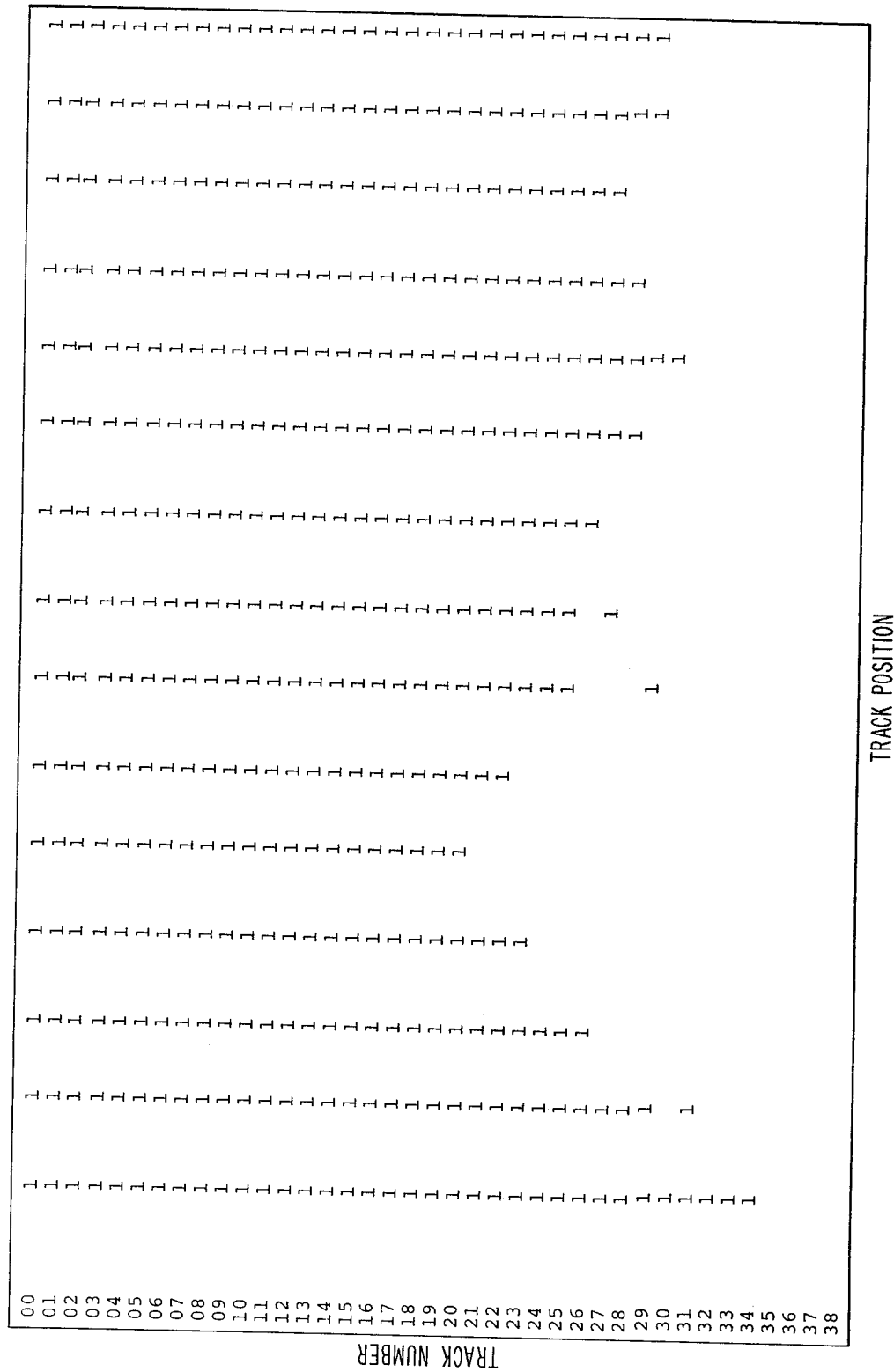

TEST SECTION G

PHASE CHANGES ALONG EACH TRACK

TEST SECTION I

FIG. 11B

MAGNETIC RECORDER TEST ARTICLE AND METHODS

DOCUMENTS INCORPORATED BY REFERENCE FOR INFORMATION ONLY

U.S. Pat. No. 3,711,691 shows programmable controllers for operating diagnostic procedures, which procedures and controls may be adapted to use test sections of the present invention.

U.S. Pat. No. 3,400,371 shows a CPU usable to control tests conducted in accordance with the present invention.

U.S. Pat. Nos. 3,550,133 and 3,303,476 show connections between a CPU and a controller for automatic implementation of test procedures.

U.S. Pat. No. 3,654,617 shows a programmable controller.

IBM Maintenance Program, IBM 3803-3420 Magnetic Tape Subsystem, Online Tests User's Guide, Document D99-3420A-09, copyright 1973 International Business Machines Corporation, Ninth Edition (March 1974), shows implementations of various automatic tests procedures.

U.S. Pat. No. 3,818,501 shows a readback system having a detector circuit usable to detect signals described herein.

BACKGROUND

The present invention relates to test articles for use with digital signal magnetic recorders, particularly those of the helical scan type, and to methods employing the test sections on such test articles.

Diagnostic procedures and master test tapes have been used for years in diagnosing, testing, calibrating and adjusting digital signal magnetic recorders. Such digital signal magnetic recorders have usually been the so-called one-half inch tape drives, such as those tape drives sold by International Business Machines Corporation and identified by Model Nos. 2400, 2420 and 3420. Such magnetic tape drives or magnetic tape units employ vacuum columns for decoupling the reels of one-half inch magnetic tape from a tape driving capstan and recording-reproducing transducers. As such, the reel characteristics are isolated from tape driving performance with respect to the recording and reproducing transducers. Additionally, the vacuum columns of such tape units apply a positive pressure such that the one-half inch tape is usually held fairly close to the transducing gaps. Even with such favorable operations, difficulties arise in transducing operations because of debris on the magnetic tape, creases on the tape and variations of many parameters in such tape units. To that end, extensive diagnostic procedures have been employed in the maintenance programs as set forth in the above-referenced maintenance programs for the IBM 3803-3420 magnetic tape subsystem. These automatically employable test and diagnostic procedures usually require the recorder to be tested to record signals and then read such recorded signals back using particular procedures for analyzing tape unit performance, including readback and recording circuits. Also, a master tape was produced using stringent parameter control conditions for calibrating such tape units for facilitating recorded tape interchange between users of such tape units. That is, a tape may be recorded by one tape drive and the signals read from such tape by another tape drive. Tape drives may be manufactured by diverse manufacturers, hence, calibrating all of the tape drives by all manufacturers to a single master tape facilitates interchange of records between users having equipment made by such diverse manufacturers.

The so-called ½ inch tape has an aspect ratio of 2400 feet to ½ inch. Data processing requirements, with which such ½ inch tapes are widely used, have a high demand for rapid access to large amounts of data. Accordingly, it was desirable to change the aspect ratio by employing a shorter wider tape. Such tape has been incorporated into a tape-containing data cartridge as shown in commonly assigned U.S. Pat. No. 3,825,208, Ser. No. 318,954 filed Dec. 27, 1972, for reducing access time to a given set of signals recorded on a tape contained in the above-mentioned data cartridge. Automatic storage and retrieval techniques for such cartridges are employed. Such techniques are described in co-pending commonly assigned U.S. Patent application Beach et al, Ser. No. 198,877 filed Nov. 15, 1971. In such an apparatus, data cartridges are not only fetched from data cartridge storing storage cells but are also automatically loaded and threaded onto tape drives. Such automatic procedures indicate that some form of automatic diagnostics and parameter measurements are desirable for ensuring that the tape drives are properly functioning.

It also became apparent that the character of recording and reproducing had to change. While longitudinal tape transport, as used for ½ inch tapes, could be employed, cost and performance factors determined that a rotating head type of device, such as used on the well known video recorders and often termed helical scan recorders, were found to be more advantageous. Digital signal recording differs substantially from video recording in that an error condition cannot be tolerated in digital signal recording, as it is in video recording. Further, video recording uses frequency modulation techniques, while most digital signal recording uses so-called baseband recording. That is, the signals being recorded are not modulated onto a carrier before recording. Because of these substantial differences and the operational requirements for digital signals being substantially different from video recording, operation of digital signal helical scan recorders can be entirely different from the operation of video recorders. Accordingly, diagnostic procedures used for maintaining video recorders would not be necessarily applicable to digital signal recorders. Further, the error inducing or failure modes of such helical scan digital signal recorders appears to be substantially different from error modes of the longitudinally transported ½ inch tapes. Accordingly, new diagnostic procedures suitable for the new set of problems is required.

Some prior test techniques include logically arranging test procedures in an analytical array. For example, in ½ inch test tapes for ½ inch tape drives, one-hundred test records constituted a test file; several test files were serially recorded in one tape reel or volume. A set of signal perturbations of a first parameter were varied in a record-to-record manner within one test file. A second signal parameter was held constant in each such test file, but varied between successive files. In logically analyzing the test results, the test file varied parameter results were arranged along rows while the record to record changed parameters were arranged in columns. The records and files were read serially.

In unit record equipment, hole positions of test type unit record or tabulating (punched) cards were varied along orthogonal axes of the card. Only one parameter, hole position, was varied.

SUMMARY OF THE INVENTION

It is an object of this invention to provide an improved test article for a helical scan recorder which includes test procedures and articles suitable for use with other types of digital signal recorders and to provide an improved master test tape particularly adapted for a helical scan recorders or other form of reel-to-reel tape transports.

In accordance with one aspect of the invention, a test tape includes a plurality of first types of recorded test sections which are spaced apart along the length of the tape, such test sections exhibiting characteristics usable to measure parameters and test operation of the recorder for determining transducer-to-medium relationships. In a second aspect of the invention, the first type test section can include tracking-test type of recorded signals. In another aspect, such first type of test section can include a multiple test-type test section, including a plurality of record tracks having transversely erased portions enabling measurement of transducer-to-medium relationships.

In another aspect of the invention, a test section includes electrically recorded signals having a compensation adjusting phase shift (phase trigger) followed by at least one test phase shift. A plurality of pairs of such phase shifts constitute a test section capable of testing readback circuits of a digital signal recorder.

Other test sections in a test tape constructed in accordance with the invention may include head-to-medium spacing tests using high frequency components for measuring spacing, dropout tests, resynchronization tests, error pointer tests and error correction tests.

In another aspect of the invention, a test section constitutes a rectangular array of parallel spaced apart tracks having variable amplitude (a first parameter) along one direction and varying phase shifts (a second parameter) along another direction. In one described form, the array is used to generate pointers usable with error correction systems for calibrating the sensitivity of such pointers and error correction systems while in a second described form timing response (clock) of readback circuits is tested.

It is a further aspect of the invention to employ methods in testing digital signal recorders using the above-described test sections as well as methods relating to such test sections employing other types of test tapes.

A further aspect of the invention is the measurement of a tape-to-head profile in a helical scan recorder wherein the recorder employs a cylindrical mandrel and the tape is helically wound about the mandrel. A test method measures head spacing along a helical scan track for generating the profile of tape-to-mandrel spacing along the helical path of the tape.

The foregoing and other objects, features, and advantages of the invention will be apparent from the following more particular description of preferred embodiments of the invention, as illustrated in the accompanying drawing.

THE DRAWING

FIG. 1 is a diagrammatic illustration of a test tape layout constructed in accordance with the teachings of the present invention. The legend relates the various test sections with respect to tests described later in the specification.

FIG. 3 is a diagrammatic illustration of a tracking test section A as recorded on the FIG. 1 illustrated tape.

FIG. 3A is a showing of a computer print-out resulting from test conducted with the test section illustrated in FIG. 3.

FIG. 4 is a diagrammatic showing of a test section B having a plurality of helical scan tracks dissected by a large plurality of longitudinally extending erasure tracks. The resulting section is termed a compound test section facilitating measurement of a variety of recorder operating parameters.

FIG. 4E – 4I represent composite computer printouts based on tests conducted using the FIG. 4 illustrated test section B.

FIG. 5 shows a partial set of idealized waveforms taken from 50 tracks of a test section C for measuring flying height for determining medium-to-mandrel spacing profiles in a helical scan recorder.

FIG. 6 shows an idealized partial set of signals from one track of a test section D usable to measure peak shift sensitivity of readback circuits of a helical scan or other type of digital signal recorder.

FIG. 6A is a showing of a computer printout based upon test methods of the present invention when used in connection with the FIG. 6 illustrated test section signals.

FIG. 7 shows an idealized partial set of signals from test section E used to test the sensitivity of readback circuits of a digital recorder to signal dropouts.

FIG. 7A is a computer printout based upon a test employing the signals illustrated for test section E.

FIG. 8 shows an idealized partial set of signals from a single track of a test section F usable as a VFC or clocking test wherein the readback circuits employ phase equalization circuits.

FIG. 8A is a partial reproduction of a computer printout based upon a test conducted in accordance with the present invention and using the signals shown in FIG. 8.

FIG. 11B is a simulated computer printout for tests to be conducted with test section I.

THE PRESENTLY PREFERRED EMBODIMENT OF THE INVENTIVE TEST ARTICLE

Figure 2:
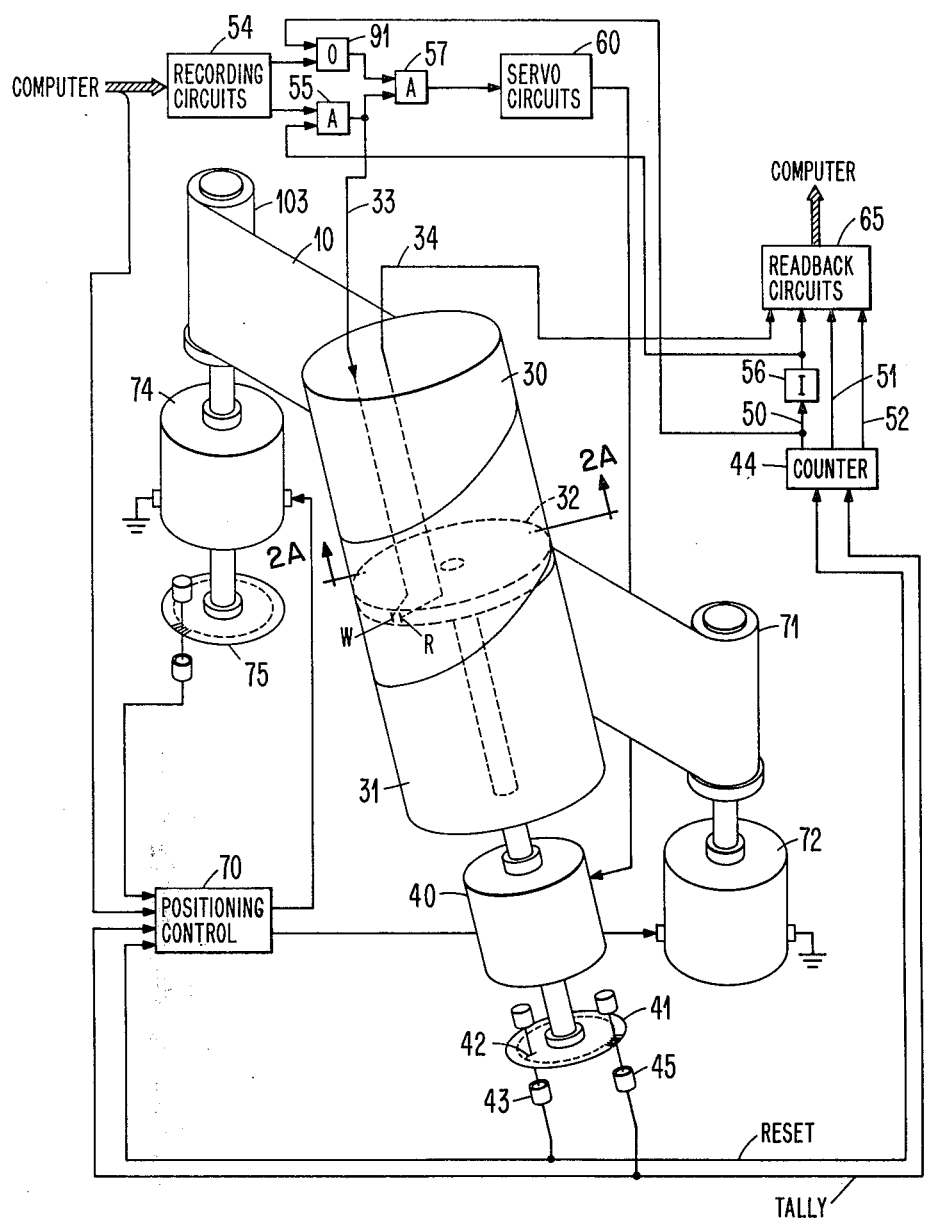
FIG. 2 is a diagrammatic showing of a helical scan recorder with which the present invention may be advantageously practiced.

Referring now more particularly to FIG. 1, a test tape article of the present invention includes a magnetically coated web 10 on which a plurality of test sections A through I are recorded, together with control tracks used in connection with the FIG. 2 illustrated helical scan recorder. A pair of servo tracks 11 and 12 precisely indicate the center lines of the helical scan tracks later described in more detail. Servo tracks 11 and 12 are constructed in accordance with known techniques and are not further described for that reason. A helical scan track identification track (ID) track 13 contains longitudinal addresses of each and every track position identified by servo tracks 11 and 12. Track 13 is read by the helical scanning rotor carried transducer, as are servo tracks 11 and 12.

While the test sections A through I are shown as being equally spaced and have an equal longitudinal extent, in a practical test tape such may not be the case. From examination of FIGS. 3 through 12, it will become apparent that different test sections have different spatial requirements. One interesting aspect of the FIG. 1 test tape is that the tracking test section A, a first type of test section, is located at the beginning of tape as at 14, at the center of tape as at 15, and at the trailing or end of tape as at 16. Such spaced apart requirements arise in helical scan reel-to-reel recorders because a helical wrap of the tape is not mechanically decoupled from the tape spools. As a result, different wrap on a tape take-up spool causes different operating parameters to be imposed upon the helical wrap of tape around the tape mandrel. As a result, tracking of the rotating head with respect to the record tape can vary. Accordingly, tracking test section A is disposed as shown for measuring variation of transducer-to-tape relationships imposed by varying tape wrap. A second type of test section, type B, is also disposed in juxtaposition to test sections A as at 21 and 22. Test section B contains signals capable of facilitating measurement of several parameters including tracking, head-to-tape spacing, skew and the like. Other test sections, C through I, can be spaced anywhere along the test tape or can be repeated. In those situations where tape wrap in a particular magnetic recorder has a significant effect on a given parameter, each of such test sections can be repeated. The location of other test sections C through I on the tape in the FIG. 2 illustrated recorder are not affected by tape wrap, hence location is arbitrary and capricious.

FIG. 2 diagrammatically shows a rotating head digital signal recording apparatus to be tested using the FIG. 1 illustrated test tape. The tape has a helical wrap around an air bearing mandrel consisting of two halves 30 and 31, the mandrel being stationary. Precisely coaxially aligned with the cylindrical mandrel 30, 31 is a single axially thin rotor 32 which carries transducing gaps W and R, gaps W, R scan record tracks disposed at 17.5° with respect to the longitudinal edges of web 10. A rotary transformer (not shown) of usual design is included in rotor 32 to provide electrical connections over lines 33 and 34, respectively, between gaps W and R and recording circuits 54, readback circuits 65 and the later described control circuits.

Rotor 32 is driven at a constant angular velocity by motor 40. Motor 40 also includes precisely constructed tachometer disk 41. Disk 41 has fiducial mark 42 precisely aligned with the angular position of gaps R and W such that sensor 43, supplying a signal indicative of sensing fiducial mark 42, provides a precise relationship of the angular location of gaps W and R for use in connection with the medium record format shown in FIGS. 1 and 4. Sensor 43 supplies its fiducial signal to reset angular position counter 44 to a reference state, such as all 0's. In addition, sensor 45 senses the positional marks evenly distributed around the circumference of disk 41. Sensor 45 supplies corresponding angular position-indicating signals to counter 44 to tally same for indicating the present angular position of gaps R and W. For example, if the counter is set to all 1's by the reset, then the tally signals from sensor 45 decrement the counter toward zero as motor 40 rotates rotor 32 and tachometer disk 41. In the alternative, when counter 44 is set to all 0's, the tally signals from sensor 45 may increment the counter. Other reference states may be used in the counter in accordance with known machine design principles.

The present count in counter 44, i.e., the indication of the angular position of gaps R and W, passes head-switching positions represented by signals on the lines 50, 51, and 52.

Since the apparatus is employed for recording digital data signals, a computer (not shown) is usually connected to the apparatus, no limitation thereto intended. The computer supplies the usual control signals for digital signal recorders and digital signals to be recorded. Recording circuits 54 receive the computer-supplied signals and convert them to a form suitable for recording on web 10. Such a form may be NRZI digital signals, as taught by Phelps in U.S. Pat. No. 2,774,646. Such NRZI recording, as taught by Phelps, is preferably encoded for reducing the charge effects in the rotary transformer. To this end, the record code taught by Patel in U.S. Pat. No. 3,810,111 may be advantageously employed for recording signals in a data signal receiving area between servo tracks 14, 15. Such recording usually includes a preamble clock synchronizing set of signals, such as those employed in phase-encoded recording.

Signals to be recorded are supplied by recording circuits 54 through AND or coincidence circuit 55; thence, over line 33 to gap W. AND 55 passes such signals only when the gap W is scanning that portion of web 10 corresponding to the digital data signal receiving area. Angular position counter 44 is constructed to decode the counts for defining such data signal receiving area by supplying a relatively low amplitude signal over line 50; i.e., the signal on 50 represents a series of tachometer counts from disk 41 corresponding to the scan portion represented by helical scan record tracks or stripes 24, 25, etc. (FIG. 4). The signal on line 50 goes through inverting amplifier 56 to AND 55 for enabling recording signals through gap W. At all other times, coincidence circuit 55 is disabled, thereby protecting the integrity of the signals recorded at a manufacturing plant in servo areas 11, 12 in accordance with the Harr patent 3,666,899.

Gap W scans the servo areas 11, 12, which have a predetermined relationship with the above-mentioned data receiving area, such that a second predetermined set of counts from tachometer disk 41, as manifested in counter 44, open AND circuit 57 to pass signals from line 33 to servo circuits 60. In this regard, whenever ID track 13 is not to be altered, the signal on line 50 passes through OR circuit 61 to enable AND 57 whenever AND 55 is disabled. Hence, in this manner, the signals on line 33 are passed to servo circuits 60 whenever the gap W is scanning a portion of the tape outside the data signal receiving area. Servo circuits 60 are constructed to ignore the data signal type of readback signals.

Gap R supplies signals over line 34 to readback circuits 65. Readback circuits 65 supply such readback signals to the computer whenever gap R is scanning signals in the data signal receiving area. At other times, gap R is scanning ID track 13, which is indicated by the signal on line 51. In a similar manner, the signal on line 52 indicates gap R is scanning a nondata area of the tape. Similarly, the signal on line 52 disables readback circuits 65 whenever gap R is not scanning the signal receiving area. The test tape of the present invention test operation of the recorder in the readback mode; i.e., test operation of gap R and readback circuits 65.

Recording or reproducing operations for the data signal area are initiated only after the article has been accurately positioned and such positioning verified, i.e., all data tracks are precisely aligned with the corresponding portions of the servo track areas 11, 12 and ID address signals at 13. Positioning control 70 coordinates web 10 transport with rotor 32 position in a known manner. Supply or payout reel 71 driven by motor 72 and machine-reel or takeup reel 73 via motor 74 are also coordinated in operation in accordance with Phillips U.S. Pat. No. 3,781,490. A vacuum column buffer (not shown) may be interposed between supply reel 71 and mandrels 30, 31. Tachometer 75 supplies position data signals to positioning control 70. Translation of machine-reel 73 rotation to actual linear tape motion is calculated by the computer in accordance with tape wrap radius on machine-reel 73. Threading web 10 from reel 71 to reel 73 is in accordance with established automatic threading techniques.

Figure 2A:
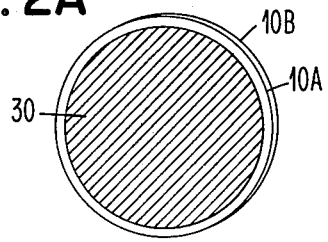
FIG. 2A is a simplified diagrammatic showing of a tape-to-mandrel spacing profile which is measurable by using the present invention.

FIG. 2A is a diagrammatic sectional view taken in the direction of the arrows along line 2A—2A of FIG. 2 showing a possible tape error condition in the illustrated digital signal recorder. Ideally, web 10 circumscribes a circular helix about mandrels 30, 31 and as represented by circle 10A of FIG. 2A. Under certain conditions beyond the scope of the present description, web 10 can be perturbed such that the helical wrap is not perfectly circular but is somewhat eliptical as indicated by line 10B. As a result, the transducer W, R to web 10 relationship or spacing is greater than what is desired. It is well known that an increased spacing between a transducer and a magnetic record medium substantially reduces the quality of signal exchanging therebetween. This is particularly true at a higher recording density wherein shorter wavelengths are employed for recording signals on a record medium. Hence, an eliptical path as represented by line 10B can cause readback errors as well as recording errors. One of the primary features of the present invention is to enable measuring that profile for facilitating returning the tape path to the idealized circular helix represented by line 10A. The adjustment of such tape drive apparatus following the measurements and parameter identifications made in accordance with the present invention is beyond the scope thereof and is not described for that reason. Many known engineering design principles may be employed for such adjustment. Calibration of each of a plurality of such helical scan tape recorders or drives is possible in accordance with the teachings of the present invention.

It is anticipated that the illustrated record medium may be used by several different tape units as diagrammatically shown in FIG. 2. Such tape units usually will have different tape-guiding characteristics yielding slightly different record stripe angles—such angle differences are termed "skew." Such skew can result in readback errors or unintended overwriting of existing records resulting in obliteration of such records. In spite of this skew problem, it is commercially imperative that record tracks be changeable without unintentionally obliterating other recorded signals. For achieving such a re-recording with multiple recorders, the FIG. 1 test tape facilitates recorder parameter measurements as now described.

The tracking test section A is shown in diagrammatic form in FIG. 3. As previously mentioned, the record areas on web 10 consist of helical scan type of stripes disposed at an angle of 17.5° with respect to a longitudinal edge of web 10 as thus seen in FIG. 4. Each of these track areas contain a large plurality of signal transitions generated in accordance with the Phelps patent, supra. Because of the addressing and the servo track signals in tracks 11, 12 and 13 of FIG. 1, the space between servo tracks 11 and 12 are clearly delineated as record track areas as represented by the narrow rectangles 80 of FIG. 3. Ideally, each digital signal recorder operating on web 10 causes its transducing gaps to scan transversely to web 10 through each of rectangles 80, with the center of the gap along the center lines 81 of the respective helical scan record track or stripe areas. As mentioned above, because of varying parameters in helical scan recorders, such idealized operation is not always achievable. Accordingly, test section A facilitates measurement of the tracking fidelity of various digital signal recorders and the sensitivity of readback circuits to such tracking errors.

Test section A enables identification of mechanical tracking problems by displacing the track center of the actual tracks in each section A from the idealized center line 81 in 1 percent increments. Track T0 is displaced zero, i.e., is located in the idealized location. Track 1 is displaced to the left as viewed in FIG. 3 by 1 percent. Other tracks are similarly displaced. Track T20 is displaced 20 percent as indicated by the hatched area 82 superposed over the idealized tracking area 80. In similar manner, track T40 is displaced to the left 40 percent as indicated by hatched area 83; track T60, 60 percent as indicated by hatched area 84; while track T100 is displaced 100 percent such that the actual recorded track 85 is adjacent and abutting the idealized location of track T100.

In one recorder employing the present invention, adjacent tracks abutted each other such that actual recorded track 85 represents an idealized track in position T101. The tracking pattern of section A then can be viewed as a no-error tracking condition in tracks T0 and T101 with increasing offsets reaching a maximum at track T50. Hence, one would expect no tracking errors to be found at tracks T0 and T101. For zero servo offset (error), the failure pattern between tracks T0 and T50, and between tracks T101 and T50, should be symmetrical. However, if the error pattern is offset by five; i.e., the failures between track T0 and T50 begin at T20, while the errors between tracks T101 and T50 begin at T75 (25 tracks from the end), servo offset of 2½ percent is indicated.

Further, if the error pattern in each track is determined and plotted as will be described, this error pattern illustrates whether or not the transducing gap travel path is precisely aligned or skewed from the idealized recording areas 80 if web 10 is incorrectly wrapped about mandrel 30, 31, the actual scanned track may have an S-shaped curve. This indicates a problem which can be corrected by adjusting the mandrel. A third parameter that is shown by this test relates to the longitudinal extent or width of the error zone which relates to the degree of cross-talk or effective width of guardband between tracks. An optimum guardband yields a minimum failure zone width (minimum printout area).

Figure 3A:
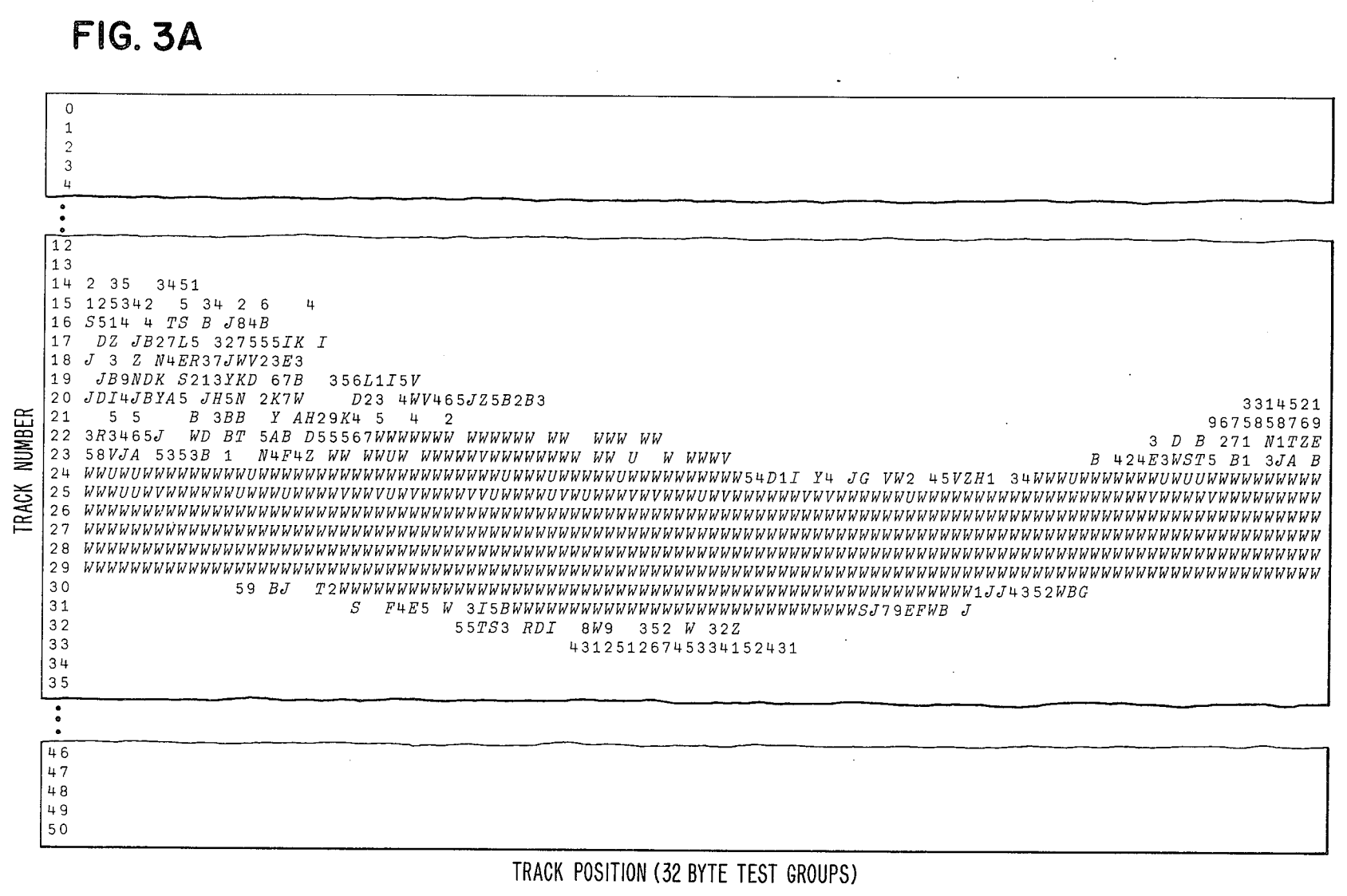

FIG. 3A illustrates an exemplary computer printout showing error analysis based upon readback signals from a second embodiment test section A. Such second embodiment included 51 tracks, the spacing between adjacent tracks having a 2 percent adjustment rather than a 1 percent adjustment as described above. Each alphanumeric symbol in the printout area represents signal quality as detected by readback circuits 65 for thirty-two 8-bit bytes. The coding is in accordance with the number of bytes in error from 1 to 32. For an error-free 32 byte group, there is no printout. Hence, the white space represents error-free readback. The coding is set forth below in Table I.

TABLE I

| Bytes in Error | Print Symbols |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | A |
| 11 | B |
| 12 | C |
| 13 | D |
| 14 | E |
| 15 | F |
| 16 | G |
| 17 | H |
| 18 | I |
| 19 | J |
| 20 | K |
| 21 | L |
| 22 | M |
| 23 | N |
| 24 | O |
| 25 | P |
| 26 | Q |
| 27 | R |
| 28 | S |
| 29 | T |
| 30 | U |
| 31 | V |
| 32 | W |

As above mentioned, the tracks at the longitudinal extremities of each test section A should be relatively error free as is the case in the FIG. 3A illustration. The horizontal coordinate of FIG. 3A corresponds to the length of the tracks transverse to the tape. It is seen that the recorder being tested corresponding to the printout of FIG. 3A has a relatively sharp cutoff between the relatively error-free condition and errors induced by tracking. Between helical scan tracks 24 and 29, essentially no readback is successful. The center of the error-indicating printout band of tracks (26.5) is nearly centered between beginning track 0 and ending track 50. Such centering indicates proper track servo adjustment. Such tests were conducted at the beginning of tape, end of tape, as well as at MOT. By conducting a series of such tests, variation of the tracking due to tape wrap on a takeup spool is easily measurable to a precise degree, i.e., down to one or two helical scan tracks. Also, the sensitivity of a given recorder to such tape wrap and other conditions is also ascertainable.

An additional aspect of the tracking test which is exemplified by the FIG. 3A printout is that the linearity or the curvature of a given track is measurable. This can relate the relationship of a travel path of the rotating head with respect to the tape medium. In FIG. 3A, a generally U-shaped configuration can be perceived in the relationship of the path of the rotating head to the medium at MOT. In a plural recorder system as shown in Beach et al, supra, using test section A for all recorders can result in significantly different results from the various recorders. Such differences indicate the recorders are handling tapes so differently that using a common tape for the recorders results in errors. This aspect of the tracking test of section A affords additional analytical power for calibrating and adjusting a plurality of commonly used helical scan type digital signal recorders.

Figure 4A:
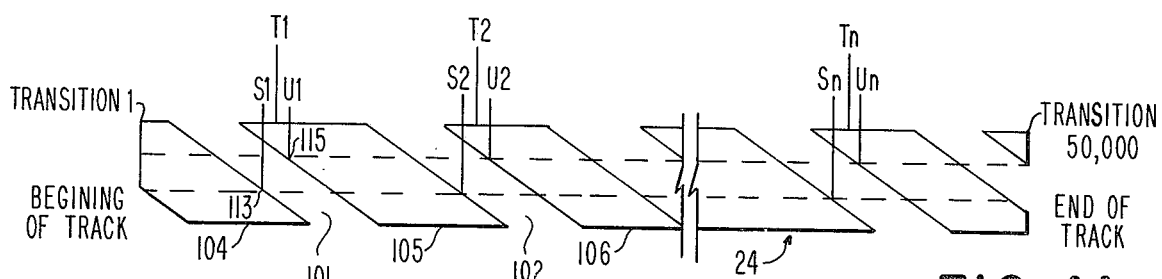
FIG. 4A is a simplified and enlarged diagrammatic showing of one portion of a helical scan track in test section B.
Figure 4B:
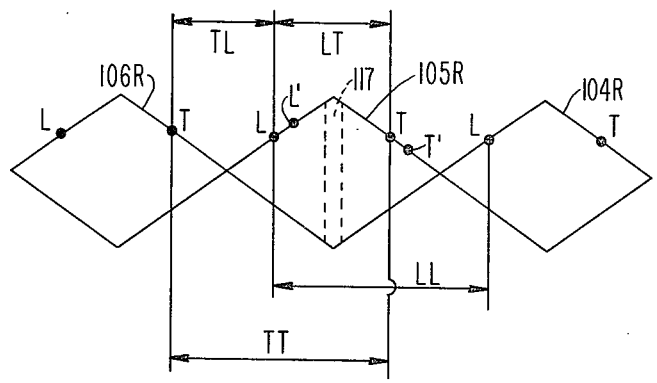
FIG. 4B is a diagrammatic showing of a readback signal envelope derived from reading recorded signals from a test section B.
Figure 4C:
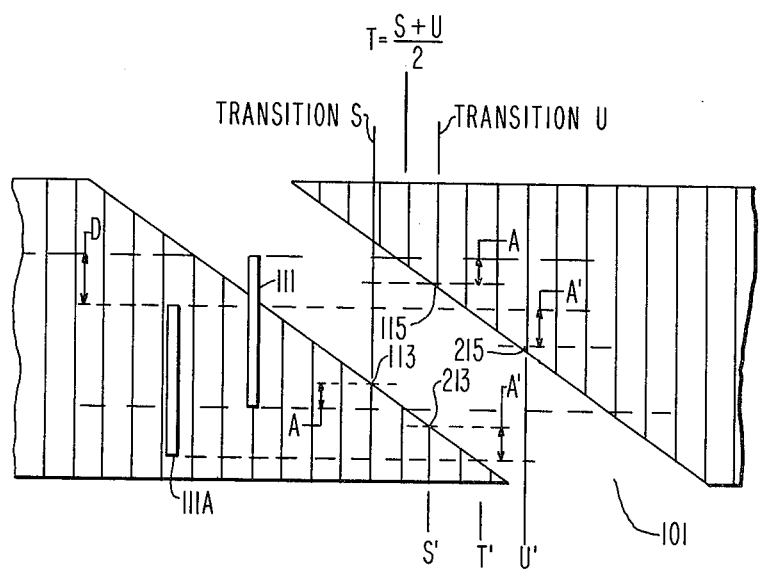
FIG. 4C is a simplified diagrammatic showing of a portion of a test section B with geometric parameters of an erasure dissecting a track in section B being accented to illustrate how the single test section is usable to measure various recorder parameters.

The compound test section B is described in detail with particular reference to FIGS. 4 through 4C. A plurality of helical scan tracks, including tracks 24, 25, are recorded in the data receiving area between servo tracks 11 and 12, each track containing a squarewave of maximum frequency, no limitation thereto intended. After the tracks are recorded, approximately 100 erasures are made longitudinally along the tape through all of the stripes such as at 100, each longitudinally extending erasure track creating a narrow angled erasure through the recorded track as seen in FIG. 4A as at 101, 102. Such erasures create erased portions or gaps between the squarewave signal sections 104, 105, and 106, respectively. In the illustrated embodiment, the actual angle of the erased portions 101, 102 is at 17 ½° with respect to the angle of the track. The width of the track 24 is equal to the width of the write gap 108 which was originally used to record the squarewave tracks. In a preferred system employing the present invention, for skew compensation purposes, the read gap 111 is substantially narrower than the write gap.

For optimum test purposes, the erasure width should have a relationship to the angle of the erasure and the extent of read gap 111 such that the readback signal envelope is generally of triangular shape and shown in FIG. 4B, wherein the readback signals 104R, 105R and 106R correspond to signal sections 104, 105 and 106.

When test section B is constructed to obtain the FIG. 4B illustrated readback signal envelope, several recorded parameters can be readily measured. These include the skew of the read gap 111 travel path with respect to the longitudinal extent of a helical scan track. The track profile, that is, a tape or web 10 may not form a circular helix about the mandrel, resulting in perturbations in the apparent geometry of the track with respect to the read gap 111 travel path; the spacing between the gap 111 and the web 10 and finally the head spacing profile around the mandrel. A high degree of accuracy in such measurements compared to prior techniques of inside measurements is afforded. The compound test section eliminates necessity of external apparatus for measuring gap-to-medium spacing by using external apparatus such as shown by Chow et al in the IBM TECHNICAL DISCLOSURE BULLETIN, "Measurement of Head to Tape Spacing," Volume 13, No. 8, January 1971, page 2259.

It will be remembered that a squarewave was recorded in each of the tracks in this section. By equally spacing erased portions 101, 102, 103, each signal section 104, 105, 106 has an equal known number of bits and can be programmed in connection with conducting the test for this section B. In this regard, refer to FIG. 4C where each of the vertical lines 112 represent a transition of a squarewave, every other line being a positive going transition with the alternate intermediate lines representing negative going transitions. By counting these transitions between signal pickup and dropout, all of the above-described parameters, plus servo offset, are measurable and indicatable. It should be remembered that the readback circuit should be carefully calibrated such that circuit variations can be accounted for in the event that absolute measurements are desired. Another procedure is to have a reference recorder of the helical scan type. All other helical scan recorders can be calibrated to reference for making absolute measurements. In the alternative, relative measurements, i.e., how one recorder compares to another recorder, can be used to great advantage for facilitating multiple recorder record media usage.

Referring again to FIG. 4C, as read gap 111 traverses from the left to the right, it is seen that an ever-reducing flux linkage occurs between signal section 105 and gap 111. Depending upon the sensitivity of the readback circuits associated with gap 111, signal dropout occurs. Signal dropout; i.e., the signal no longer can be detected, may occur as at 113.

The dimension A is proportional to the minimum signal required for detection and may be a different value for different recorders. It is a function of many variables in the transducer and readback circuits. For a given recorder, the same value A determines the point 115 where detection begins as well as 113 where detection ends. It can be observed from FIG. 4C that an increase in the value of A symmetrically shifts point 113 left and point 115 right. This symmetrical property enables calculation of a transition count T;

$$T = \frac{S+U}{2}$$

which is the average of the transition counts S and U and is independent of the A dimension. S is the count at signal dropout and U is the count at the onset of signal recovery. It will be shown how count T indicates tracking.

FIG. 4A shows erasure tracks intersecting a written track at equal intervals along the written track. For each erasure track a unique transition count for S, T and U is determined by counting transitions sequentially from beginning to end of the track. This is practical to do because the nondetected dropout widths are short enough that the system clock does not lose synchronization with the readback signal. By reading this tape on a helical scan digital recorder, a set of values T1, T2, . . . Tn are determined which are characteristic of tracking of that recorder.

Referring again to FIG. 4C, let 111A be the position of the read gap on a given read pass. A different set of transition count values S', T', and U' result from any lateral displacement (D) of the read head from the previous read pass. It can be shown by geometry that the difference in values (T-T') relates to the difference in tracking (D) by the relationship $$D = \frac{(T-T')\tan \phi}{R}$$

where $\phi$ is the angle between the write track and the erase track and R is the transition density in number of transitions per inch. It was previously shown that A may differ in value from A' without affecting the value of T. Therefore T-T' truly reflects tracking differences, even between recorders with different electronic or magnetic gains.

It follows that since each erasure intersection provides a tracking measurement (D), the simple subtraction of the vector T1, T2, . . . Tn from a subsequent read T1', T2', . . . Tn' provides a profile of tracking difference along the track length. The reference vector T1, T2, . . . Tn may be derived in a variety of ways depending on the required test results. It may result from reading the test tape on a reference recorder. If measured deviation from a norm is required, it may be the statistical average of a large number of helical scan recorders. It may result from very accurate calibration of recording device used to create the test tape. In many applications the references may not be required where only differences from one read to another read are of interest.

Figure 4D:
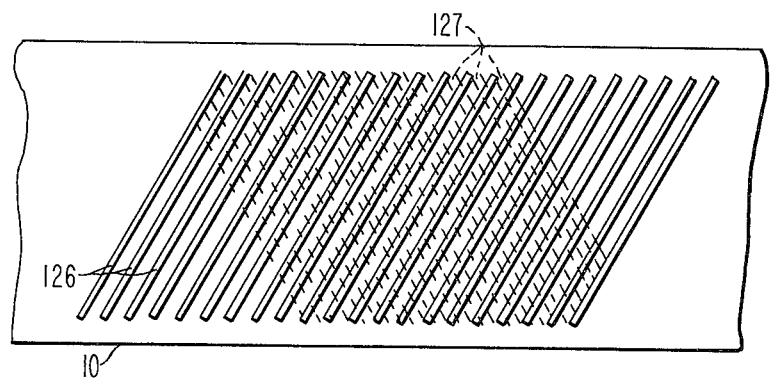
FIG. 4D is a diagrammatic showing of a second version of test section B.
Figure 4E:
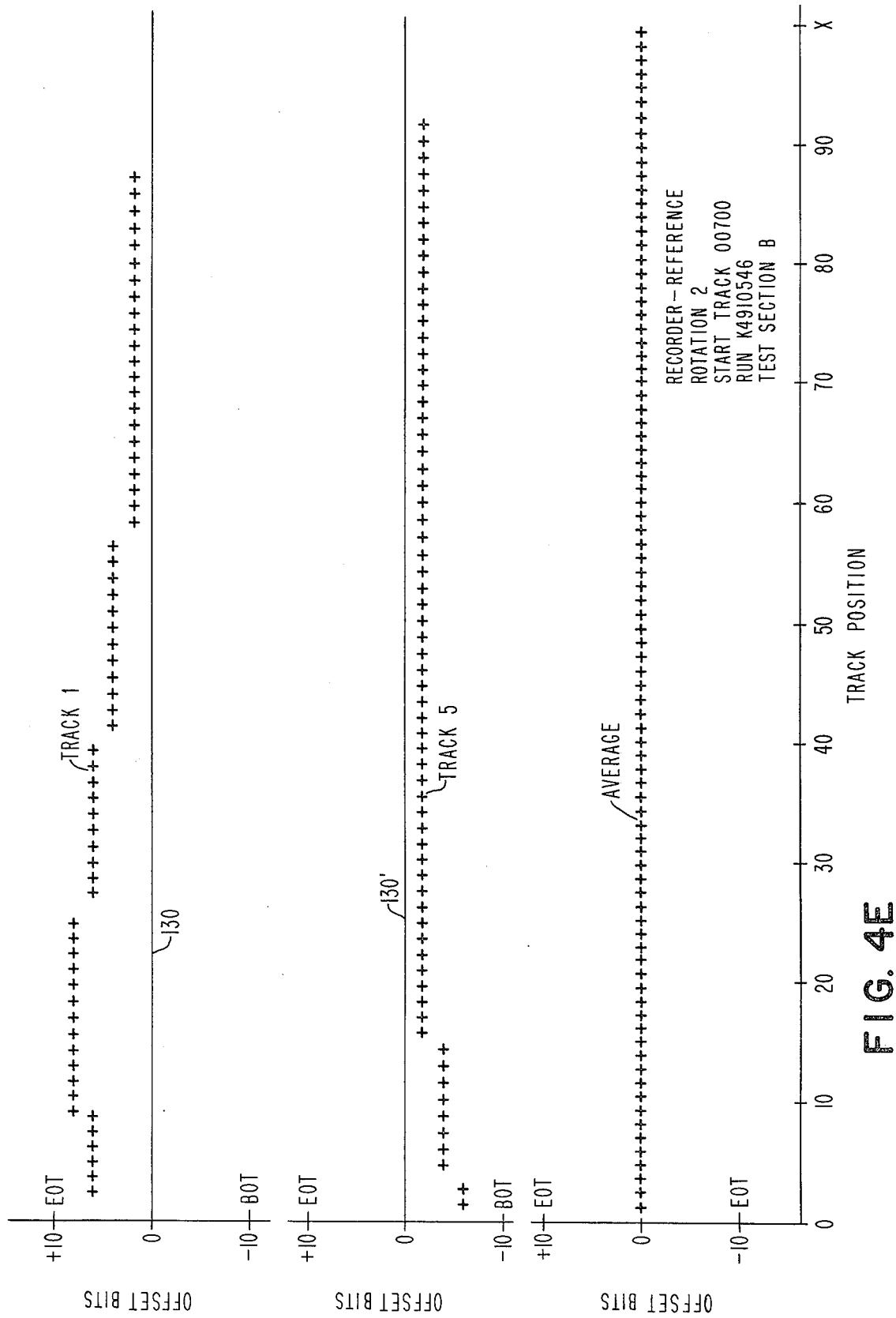

FIG. 4E shows typical track profiles. The reference, line 130, in this illustration is the average of 10 tracks read on the same recorder. Therefore, the top profile shows track 1 referenced to the average of the 10 tracks. The middle profile shows track 5 and the bottom profile shows the average of 10 track which is the reference. Both the profile and the average position of the profile with respect to the reference are significant. The average position relates to servo offset while the shape relates to the helical wrap of the web. FIG. 4G shows the same test tape read on a different recorder. Here the bottom profile is the average of 10 tracks on the second recorder with respect to the reference 130. This relates to the true tracking differences between the two recorders.

Again referring to FIG. 4C, the value of A has been described to vary between recorders. The only significant parameter known to cause a change in the value of A for a given recorder during the reading of a track is the head to tape spacing. It can be shown by geometry that the dimension A is directly proportional to the quantity S-U which is directly available from the previously described test data. Therefore, for each tracking profile a second profile relating to head to tape spacing is available.

Figure 4F:
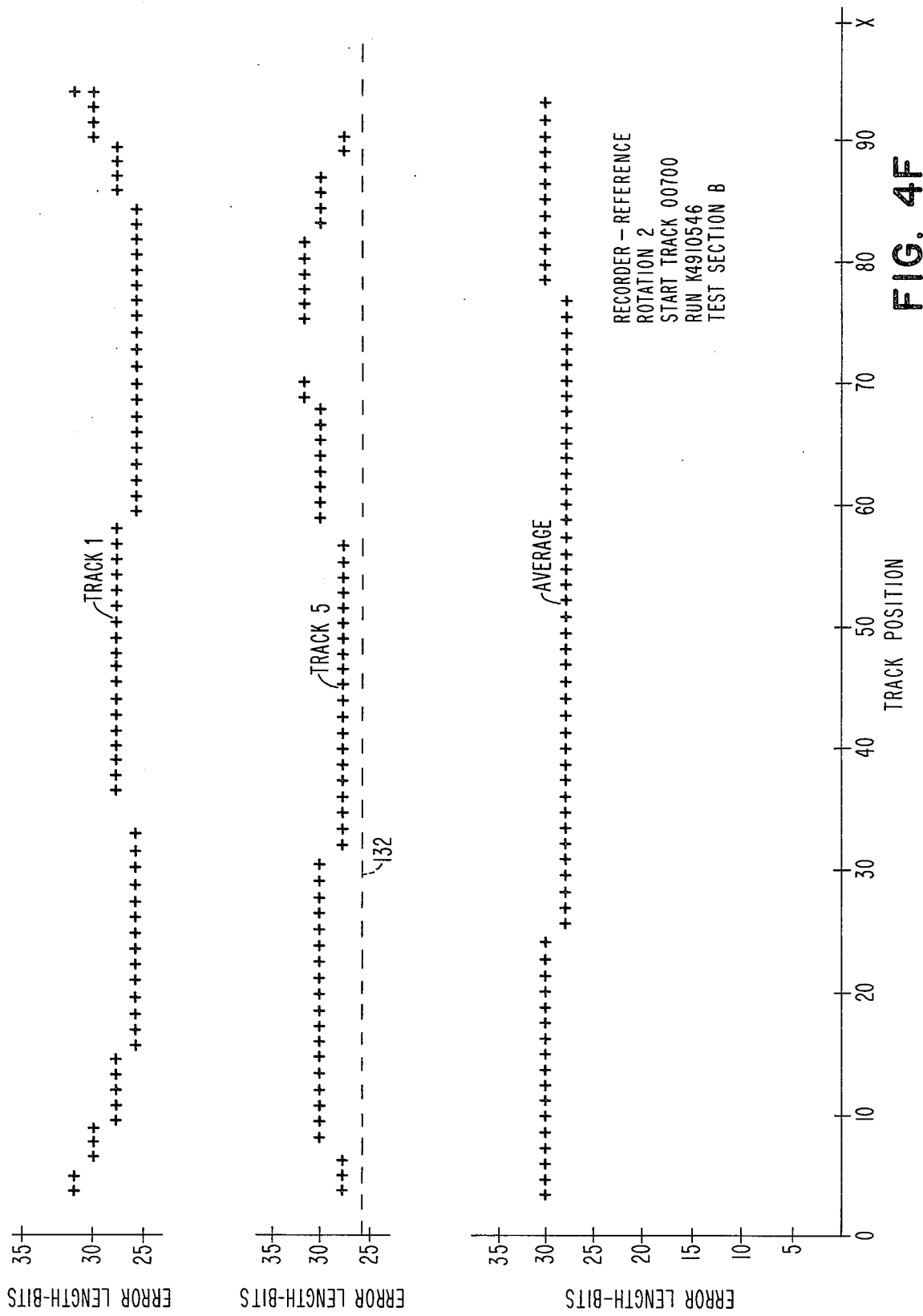
Figure 4G:
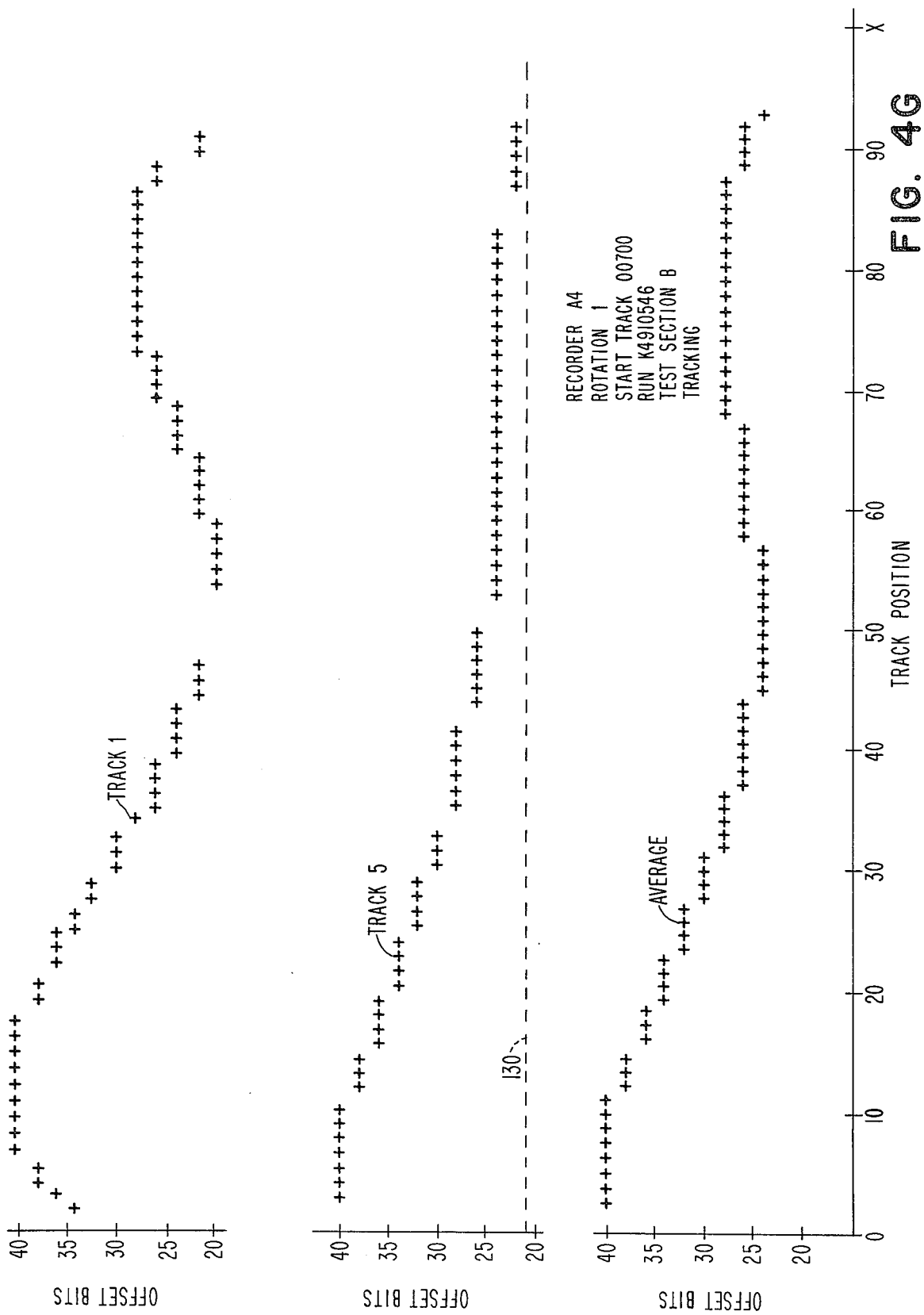

FIG. 4F shows head to tape spacing corresponding to the tracking profiles of FIG. 4E. The reference average 132 is simply a constant which relates to the required total electronic and magnetic gain of the read system. Hence, this test checks a recorder for proper gain and uniform tape to head spacing.

First referring to FIG. 4D, a similar test section to that described, with respect to FIG. 4, is shown in diagrammatic form. The helical scan tracks 126 on a web 10 are constructed in the same manner as described for FIG. 4. The erasure tracks indicated by dash lines 127 are disposed at supplementary angles to helical scan tracks 126 rather than being disposed longitudinally, as in FIG. 4. In the FIG. 4D illustration, the angle of erasure tracks 127 with respect to the longitudinal edges of web 10 is supplemental to the track 126 angles, no limitation thereto intended. The FIG. 4D illustrated configuration yields a different angle of erasure with respect to the length of the helical scan tracks 126; hence, different calibrations and result are attainable by varying the erasure track's direction from being longitudinal to any selected other angle with respect to the helical scan tracks being dissected. Various test results can be achieved, all within the teachings of the present invention.

As above partially described, FIGS. 4E through 4I are composite graphs derived from computer printouts using test section B as source data to different digital signal magnetic recorders. The first recorder is termed a reference recorder such that the second recorder, entitled "Unit A4," may be calibrated thereto. FIGS. 4E and 4F are illustrative of calibrating reference in that the reference recorder was tested during the second rotation of a rotating head; that is, as a tape was moved with respect to the rotating head travel path, one rotation of the head elapsed after reaching a desired transducing relationship before the tests were conducted. This allows the web 10 to stabilize before tests are conducted for calibration purposes. In FIG. 4E, two of the tracks, tracks 1 and 5 of the tracks 0 through 9 in the test band, are shown for illustrating the type of readout obtained, together with the average of all readings from all tracks 0 to 9. Track 0 corresponds to helical scan track address 00700; track 1 is 00701, etc. Such a track number is closed to the beginning of tape, such as at 20 of FIG. 1. In FIG. 4E it is seen that track 1 has a generally positive offset from the idealized tracking position indicated by horizontal line 130. The positive offset indicates that the tape path is reading toward the end of tape side of track 1. Such measurement is accomplished as indicated in FIG. 4C. In a similar manner, track 5 indicates that its offset is toward the beginning of tape, i.e., a negative offset, from idealized track center 130'. Since the recorder is a reference recorder, the average is a straight line at an idealized calibration reference for other digital signal recorders with which the reference recorder serves as a standard.

In a similar manner, FIG. 4F is a composite graph showing error lengths, i.e., number of bits between T and L, as shown in FIG. 4B. Again, tracks 1 and 5 of tracks 0 to 9 were selected for illustration purposes. Starting track is still 00700, with track 1 being 00701, etc. In track 1, the average dropout has oscillated about 30 bits long. The same is true for track 5 which varies between 32 and 26 error bit dropout lengths. The average also varies, indicating a profile of the recorded track with respect to the rotating transducer travel path.

Figure 4I:
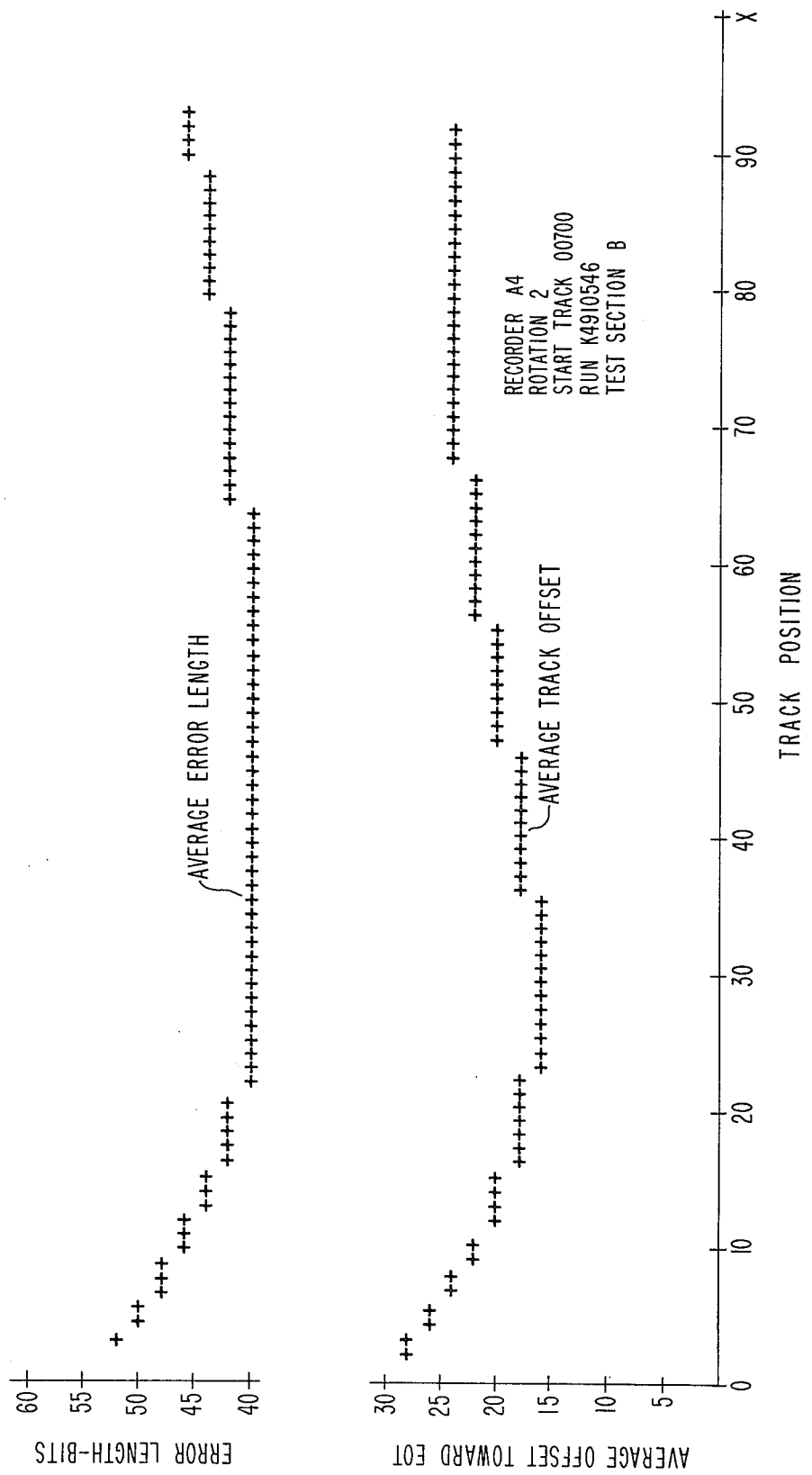

The above two composite charts can be compared favorably with FIGS. 4G and 4H, respectively. The average plot in FIGS. 4G and 4H shows the relationship between unit A4 and the reference unit. Note the offset for recorder A4 is substantially greater than that for the reference recorder. The average shows the track offset is roughly 40 bit positions with respect to the average offset of a reference recorder. Note also that graphs 4G through 4H were made on the first rotation of recorder A4 yielding less desirable results than that set forth in the calibration. A better comparison is shown in FIG. 4I which is a composite of the average error length and the average track offset for recorder A4 on the second rotation. It is seen from FIG. 4I that the rotating head tape path to track relationship has improved over the first rotation relationship.

Figure 5A:
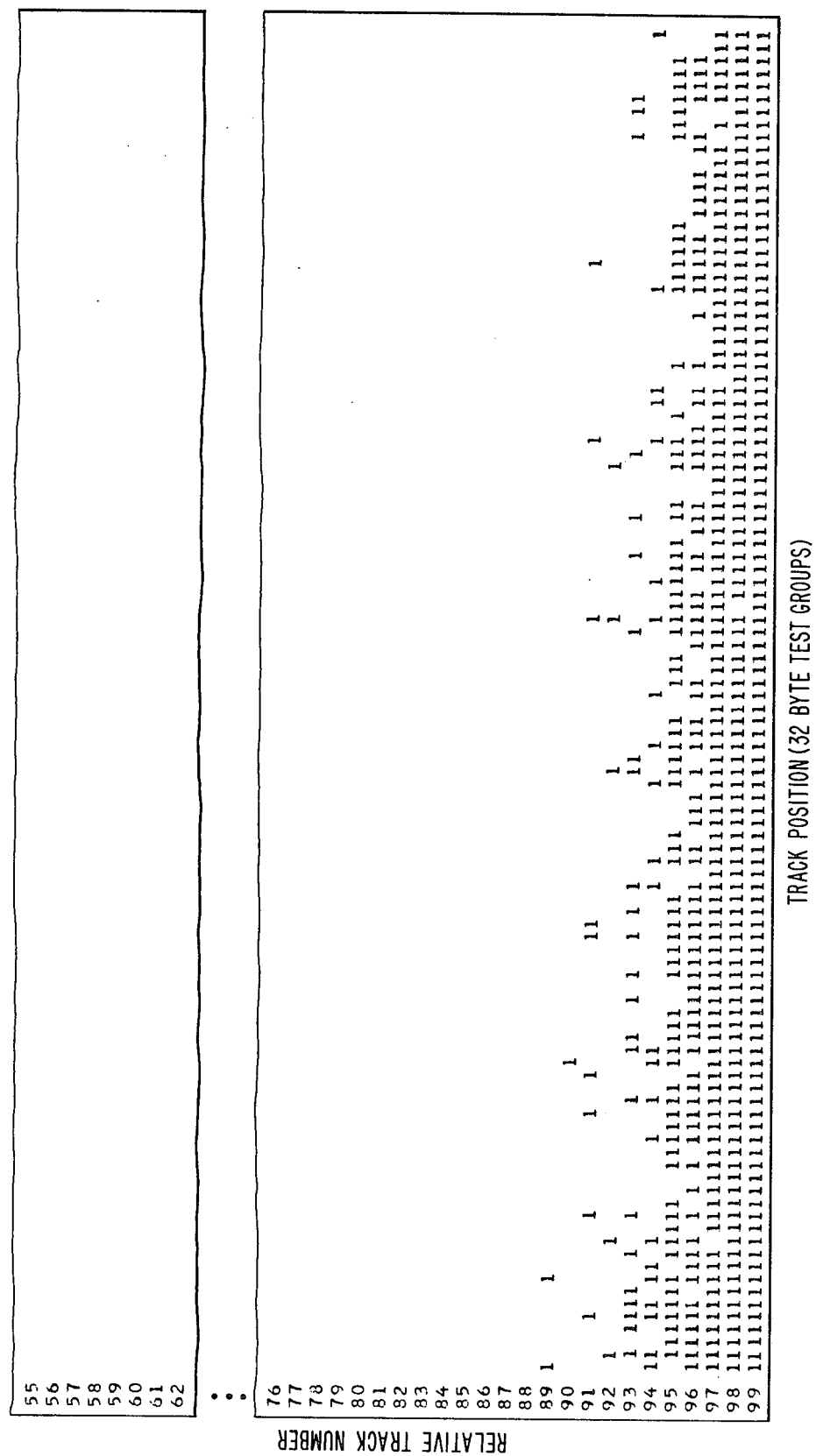
FIG. 5A is a representative computer printout based upon test methods usable with test section C recorded signals.

Test section C is for measuring head-to-medium spacing based upon a series of energy reduced signals mixed among the test stripes numbered 0 through 99. The pulse duration reductions are in 1 percent steps for the 100 tracks, such as shown in FIG. 5. One reduced pluse is located in each of the 32-byte test groups. In test track 00 full amplitude is provided. At test track 50, half energy is provided by pulse slimming unitl track 99, which has essentially very little duration for the energy reduced pulse. In FIG. 5A, the error pattern is shown from track 99. The error pattern from track 89 through track 96 shows the sensitivity and the sharp cutoff of the readback circuits of the digital signal recorder being tested. For FIG. 5A, the test was conducted on the reference recorder such as shown for FIGS. 4F and G. FIG. 5A, therefore, shows a reference printout for calibrating digital signal recorders. If a particular digital signal recorder started dropping out at track 80, it would indicate that the tape-to-head spacing is too great; that is, the helix wound by the tape over the rotating head is too loose. In a similar manner, offset head spacing, i.e., a non-circular helix, such as shown in FIG. 2A, can be detected. For example, referring to FIG. 5A, if the left-hand portion of the figure indicated errors started at track 99 and then diminished in error rate to track 89 indicates a particular profile of head-to-medium spacing is indicated. Corrective action then can be obtained based upon critical analysis of the printout; such analysis is beyond the scope of the present invention.

The peak shift test of section D can take several forms as a function of the data recording modulation code. For example, a run-length limited modulation code may have a minumum run-length of two and a maximum run-length of four zeroes in a row (no transitions). Various peak shift characteristics occur based upon a data content. FIG. 6 illustrates a peak shift test using a 1-3-1 test pattern, wherein the 1 represents the smallest allowable one-half wavelength, while 3 represents the maximum allowable wavelength. It is well known in magnetic recording that the longer wavelengths tend to be reduced because of recording characteristics while the narrower adjacent wavelengths tend to be lengthened. This has the effect of moving the critical transitions such as at 137 and 138 to a position wherein the transition is out of a detection window. As shown in FIG. 6, transitions 137 and 138 are almost to the next allowable transition position at 140 and 141, respectively. At the half-way point, the electronic detectors of readback circuits cannot tell which cell the peak shifted or phase shifted transition belongs to. That is, transition 137 can either represent a transition at 140 or at 142, while transition 138 can represent a transition either at 141 or at 143. Transition positions 142 and 143, of course, would be the desired location of transitions 137 and 138. The phase shift or peak shift test of section D tests the sensitivity of a digital signal recorder to such phase shifting and error inducing perturbations of readback signals. The phase shifted test pattern is included in each 32-byte test group; i.e., for each possible symbol position of the computer printout. The reason for this is that in recording such test patterns, certain tolerances may occur resulting in different phase shifts than that precisely desired as well as variations in the readback signals reacting differently to such phase shifted test signals.

In the digital signal recorders tested in accordance with this invention, the readback circuit 65 included phase equalization circuitry such that phase errors as recorded on a tape would be phase compensated to facilitate error free detection. In order to afford a true test of a digital signal recorder having such phase equalization circuitry, a lead phase trigger consisting of a phase leading shift as at 148 shifts the transition from desired transition position 149. This lead phase trigger causes the phase equalization circuits (not shown) of readback circuit 65 to be saturated such that a more accurate response of the peak shifts at 137, 138 can be measured in the digital signal recorders.

Hence, in accordance with the present invention, peak or shift is tested in a digital signal recorder by test patterns following a lead phase trigger shift for initially introducing perturbations in readback signals. For stressing the operation of such readback circuits, the maximum for a given phase shift in each of the test patterns, such lead phase trigger shift is incrementally varied from nominal to failure. Following each test pattern such as 137, 138, a lagging phase trigger as at 150 restores the phase of the readback signal to the desired ideal transition position. Instead of a lead phase trigger as at 148, a lag phase trigger as at 151 may also be employed. For example, the desired transition position is at 152. However, the actual transition position is moved to 151, a 25 percent phase shift. A phase test pattern as at 153 follows the lag phase trigger by several cycles in the same manner that test pattern 137, 138 followed the lead phase trigger. Phase recovery after the test pattern is afforded at 154. It is preferred that all signals, other than the test patterns and the phase triggers, be a squarewave at maximum frequency of the signal to be used with the recorder being tested.

In one embodiment of the present invention, test section D included different combinations of test patterns. In the exemplary embodiment, two was the minimum wavelength corresponding to one as described above, and four units was the maximum wavelength. Test patterns used are 4-2-4, 2-4, 4-4 and 3-3. In the second pattern, the 2-4 pattern, the preceding wavelength could be a 2 but not a 4.

FIG. 6A is a partial computer printout based upon tests constructed as set forth in FIG. 6 but for a 4-2-4 pattern. The test pattern began at track 00 out of 50 tracks with a maximum lag phase shift trigger such as at 146 of FIG. 6, half-way between transition 147 and desired transition position 142. This results in errors throughout track 0, such as is indicated in the printout by numeral 3. That is, all three phase shifts resulted in errors; the phase trigger, the phase shift and phase return. Phase shift is decreased in small steps until there is zero phase shift at track 25. It is seen that tracks 18 through 36 are substantially error free, indicating the zone of phase shift tolerance of the digital signal recorder being tested. In tracks 09 through 17, the error pattern indicates polarity sensitivity to such phase shift. The term "polarity" refers to the direction of the phase shifted transition, going positive or going negative. That is, while one polarity of phase-shifted transition results in an error, the opposite is recoverable. The illustrated FIG. 6A computer printout resulted from tests conducted on the reference digital signal recorder used above in other tests.

Figure 7A:
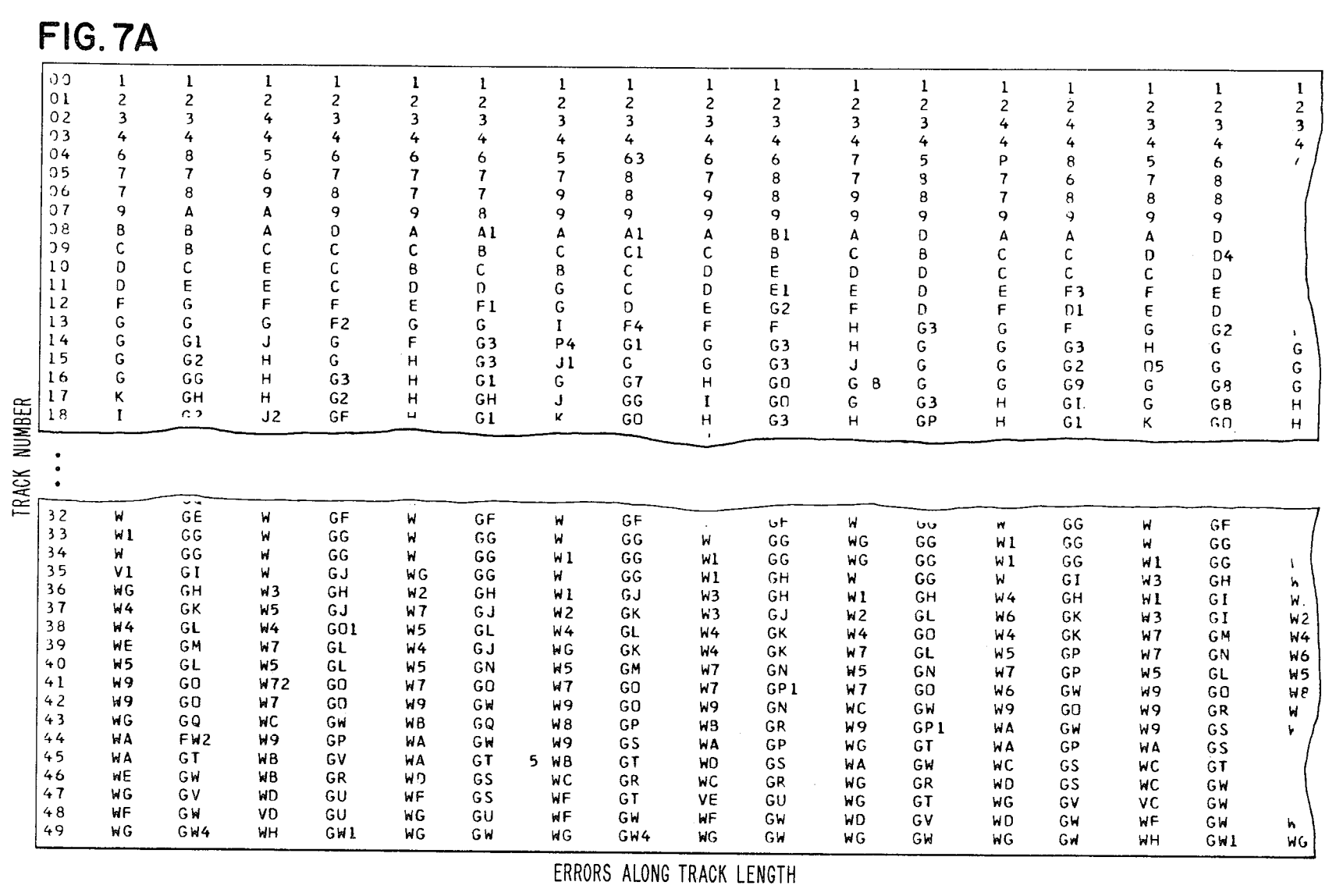

FIG. 7 illustrates dropout test section E. It is preferred that a high frequency squarewave be recorded outside of the dropout sections. Each dropout consists of an erased portion of predetermined length in each of the multiple-byte test groups, starting out with a minimum dropout on track 00 with a maximum dropout at track 49. As seen in FIG. 7, the dropout begins at 160 and continues for one byte length to position 161, whereupon a squarewave is again recorded. The second dropout consists of 2-byte lengths beginning at 162, continuing through 163. The 2-byte dropout is recorded in track 01 in each of the 32-byte sections. It is seen that 1 byte is in error in track 0 for the 1 byte time dropout while 2 bytes are in error for the 2-byte dropout. In a similar manner, tracks 2 through 49 have increments of one byte length, increased dropout lengths. Accordingly, the number of errors should increase. It should be noticed that the error rate increases faster than the dropout length, indicating that the readback circuits do not recover from the elongated dropouts. Dropout tests, therefore, show the sensitivity of a given digital signal recorder to dropout lengths. The FIG. 7A illustrated computer printout resulted from a test on reference recorder. For a full 50-byte dropout type of test, each of the columns in FIG. 7A represents one signal dropout test. As readily seen, each test track has multiple equal length signal dropouts spaced along the track length.

Referring next to FIG. 8, a selected waveform from one track of test section F is shown. Test section F and test section D are somewhat similar in that each have an initial phase trigger for perturbing the readback circuit phase equalization circuits (not shown). In FIG. 8 transition 170 is downstream (phase lag) shifted a fixed amount from the idealized transition position 171.

A varying number of maximum length half wavelengths, which are all downstream shifted to the same degree that transition 170 is phase shifted, follow the phase trigger shift. At 172 the transition is phase shifted in incremental amounts between the phase forward position at 173 to a phase lagging position at 174, to test the sensitivity of the clocking system of readback circuit 65 to a downstream shifted signal followed by a severe phase shift at 172.

In accordance with the above, this test section enables a test of the response of a readback clock to the initial phase shift trigger. A readback clock, such as shown in Crumb et at U.S. Pat. No. 3,562,661, follows the frequency and phase of a readback signal to generate data detection timing pulses synchronized with the readback signal. By varying the initial phase shift and the number of intervening signal transitions to a next severe phase shift in the same direction, a measure is obtained of how a readback clock recovers from the first phase shifts. Whenever the number of intervening transitions are insufficient for phase recovery, the partially recovered clock responds poorly to the next severe phase shift. Hence, the test allows a measurement of the number of intervening signal transitions required for a given clock to recover from a given phase shift trigger.

The transition 176, following the test area at 172, is shown as being downstream shifted in the same amount as transition 170. In the alternative, transition 175 may return to the idealized nondownstream shifted transition position as at 175.

Figure 9:
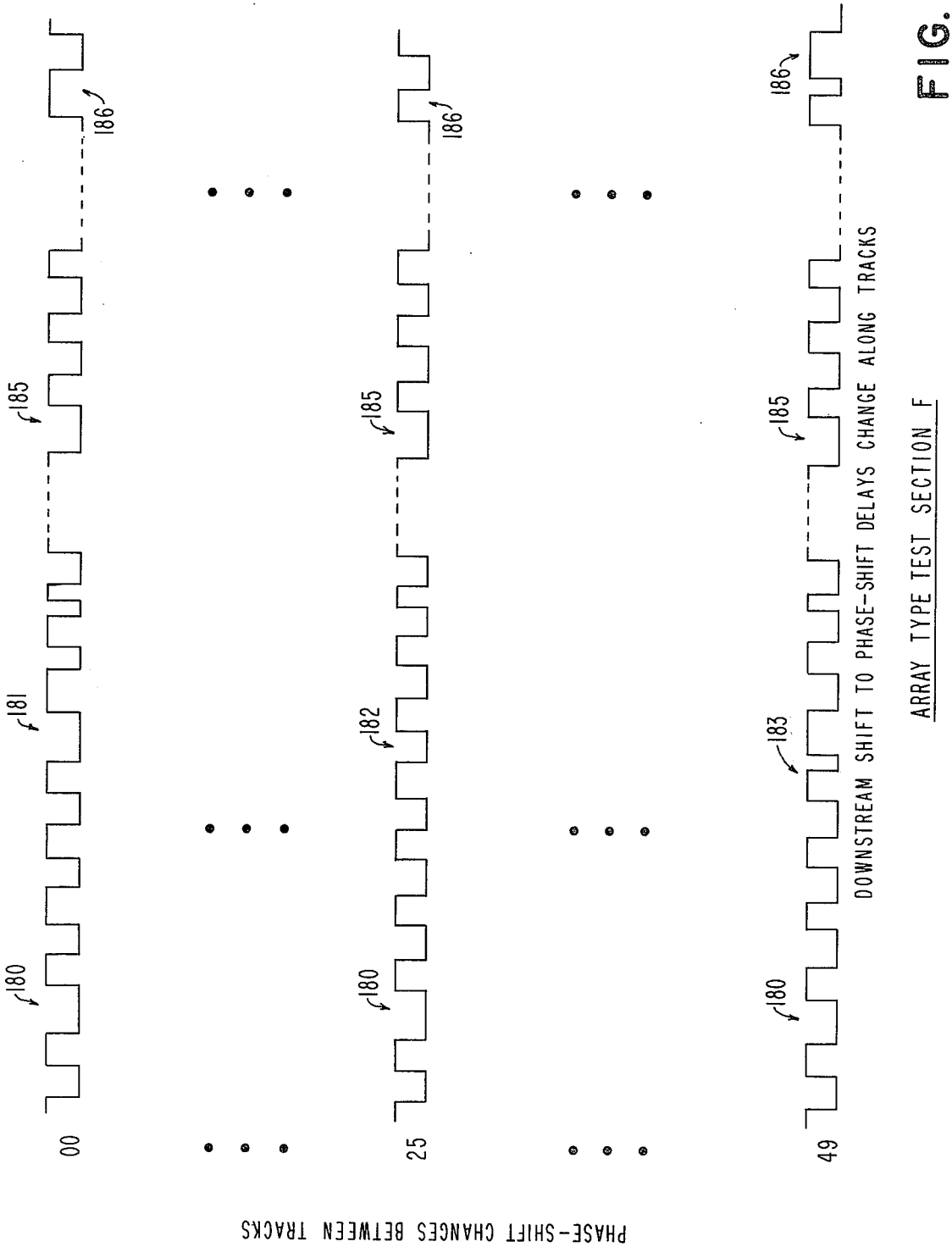
FIG. 9 is a diagrammatic showing of a rectangular array arranged clocking test using the principles shown in FIG. 8.

In order to obtain a more informative profile of clock response than achievable by the FIG. 8 illustrated signal pattern, an array of signal patterns in a plurality of helical scan tracks, having two varying parameters as shown in FIG. 9 is preferably used in test section F. In each of the several tracks, the number of transitions between the downstream shift 170 of FIG. 8 and the clocking phase perturbation, such as at 172 of FIG. 8, is varied. For example, the first bit displacement between the initial downstream shift in all the tracks as at 180, eight transition positions from 180, a unique phase shift amount is introduced in the respective tracks as at 181, having a maximum lagging phase shift to zero phase shift in track 25 at 182, and continuing on for increasing leading phase shifts at 183 in track 49. Each of the tracks have the identical phase shifts as shown respectively at 181, 182, 183. Further along the tracks, the initial downstream shift for another test group of bytes at 185 has the same magnitude downstream shift as at 180, but is separated from the clocking phase test portions 186 by 110 transition positions. Intermediate sections 180, 181 and 185, 186, displacement between the downstream shift and phase test portion will vary. In using test section F, it would be expected that the clock of a readback circuit 65 would fail in test section 180, 181, 180, 182, 180, 183 and would successfully recover in the last test section 185, 186. However, generation of timing signals from a readback signal is subject to amount of phase shift. Accordingly, more error would occur in track 00 than in track 25. Similarly, more errors would occur in track 49 than in track 25. A clock response profile representing responsiveness to two successive phase changes of varying degrees would be produced similar to that shown in FIG. 6A; that is, a central zone of clocking success around track 25 would appear to the center of the printout. At each extremity, phase lag and phase lead, respectively, in tracks 00 and 49, a high failure rate would be expected.

The above-described profiling is obtained from test section F because a delay (first parameter) between successive phase changes is varied along one orthogonal dimension and a degree of phase shift (second parameter) is varied along a second orthogonal direction; i.e., between the tracks. Such array approach to test section generation provides the most flexibility in profiling and predicting operation of apparatus being tested. In a helical scan recorder, such array being formed within the test section itself provides a compact and rapid tool for testing helical scan recorders at a given tape location. The same principle is followed with respect to error correction tests described later with respect to FIG. 11.

FIG. 8A is one-half a computer printout showing an error pattern derived from a test section F clocking test using the FIG. 9 illustrated signal arrangement. One-hundred tracks having 1 percent changes from track-to-track were used rather than the FIG. 9 illustrated fifty tracks with 2 percent increments. As predicted, tracks 00-20 induce clock failures along the entire track lengths. From tracks 21-34, the clock failure varies along the track lengths yield tape spacing profile indications. The other half of the printout had a complementary error-free to error transition.

Figure 10:
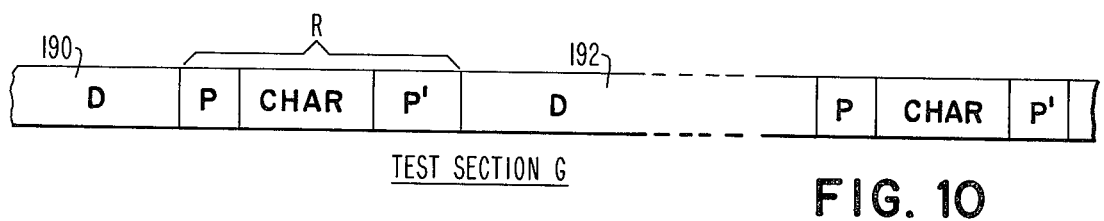
FIG. 10 is a simplified showing of a record track of a tape usable with a helical scan recorder having resynchronization points.

FIG. 10 shows the principles used in connection with construction resynchronization test section G. This particular test section relates to testing apparatus shown in commonly assigned copending patent application Marshall Ser. No. 372,389 filed June 21, 1973 and Patel patent, supra. The terms A and B sequence refer to those sequences set forth in those co-pending patent applications. In FIG. 10, serial strings of data as at 190 and 192 are separated at predetermined intervals by a resynchronization set of signals R. The actual rephasing, reframing or resynchronizating of the readback circuit 65 is accomplished by a center portion labeled CHAR which is the actual resynchronization character which carries information unique within the recording system for informing the readback circuits of the precise phase of the signals for representing data in a proper manner. CHAR bracketed by a set of frequency synchronizing signals P and P' used to frequency synchronize the readback circuits in a known manner may sequence a reading or recording. Data portion 190 is first hand, followed by R, then section 192. In accordance with test section G, extra transitions are inserted into portion P' or deleted from portion P' to introduce phase errors on data section 192. In accordance with the referenced patent applications, two transitions represent one data bit. If the phase of the readback signal is the so-called A sequence, then the data is read correctly. If the readback signal is in a so-called B sequence, then the data readback is shifted with respect to the data being represented. According to Marshall supra, error correction is achieved by shifting B sequence readback signals into A sequence readback signals. Test section G, inter alia, tests this ability as well as the ability of the readback circuit 65 to detect such errors. If an extra transition is inserted, then the actual signals in section 192 will phase lag the clock of readback circuit 65. If transitions are deleted, then these readback signals from section 192 will lead the phase of the readback circuit operation. Such changes are set forth below in Table II.

TABLE II

| Transition Change | Sequence Shift |
| --- | --- |
| +1 | A → B Lag |
| +2 | A → A Lag |
| −1 | A → B Lead |
| −2 | A → A Lead |

Error pointer test section H merely contains a plurality of helical scan record tracks with selected signal perturbations designed to assuredly obtain error pointers based upon reading such tracks. Such pointers may be those pointer signals described by Hinz, Jr. in U.S. Pat. No. 3,639,900. In addition to single pointer signal generation, this pointer signal test section may include a plurality of signal perturbations for insuring that readback circuit 65 can accomodate a plurality of pointer signals. Such pointer signals are used in connection with error detection and correction operations as described by Hinz, Jr. supra. Such multiple pointer signals are useful for ensuring that algorithmic pointer signal handling is in accordance with logic design of readback circuit 65.

Figure 11A:
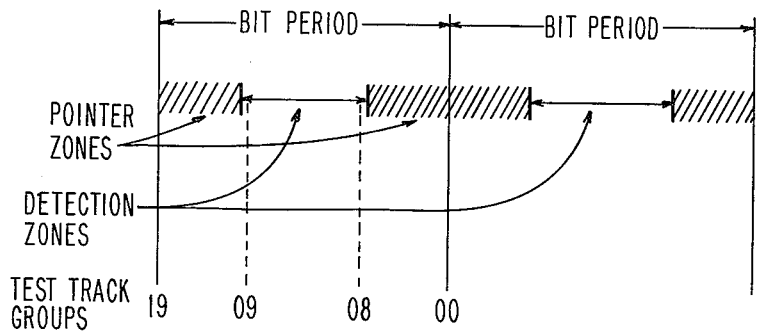
FIG. 11A is a diagrammatic showing of phase shift to bit period relationship for test section I.
Figure 11:
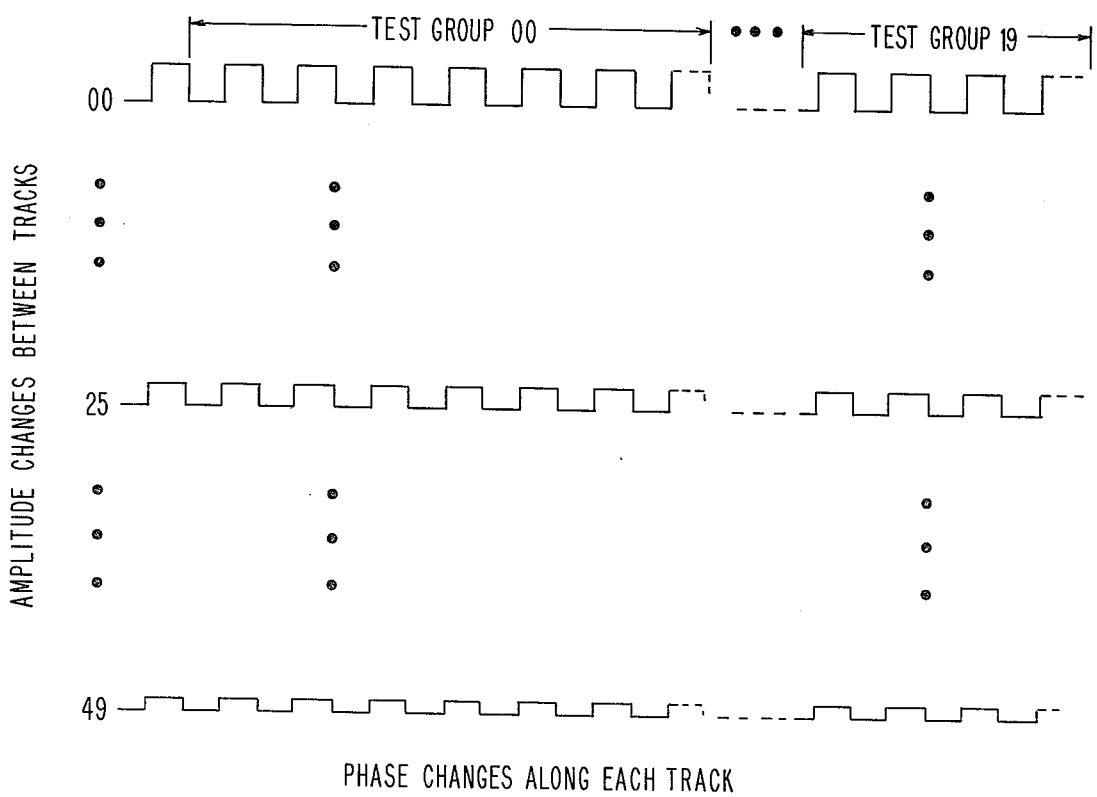
FIG. 11 shows an idealized partial set of signals for test section I having orthogonally varying phase and amplitude parameters for testing error detection and correction circuits, as well as sensitivity of readback circuits to combine phase and amplitude variations.
Figure 11B:
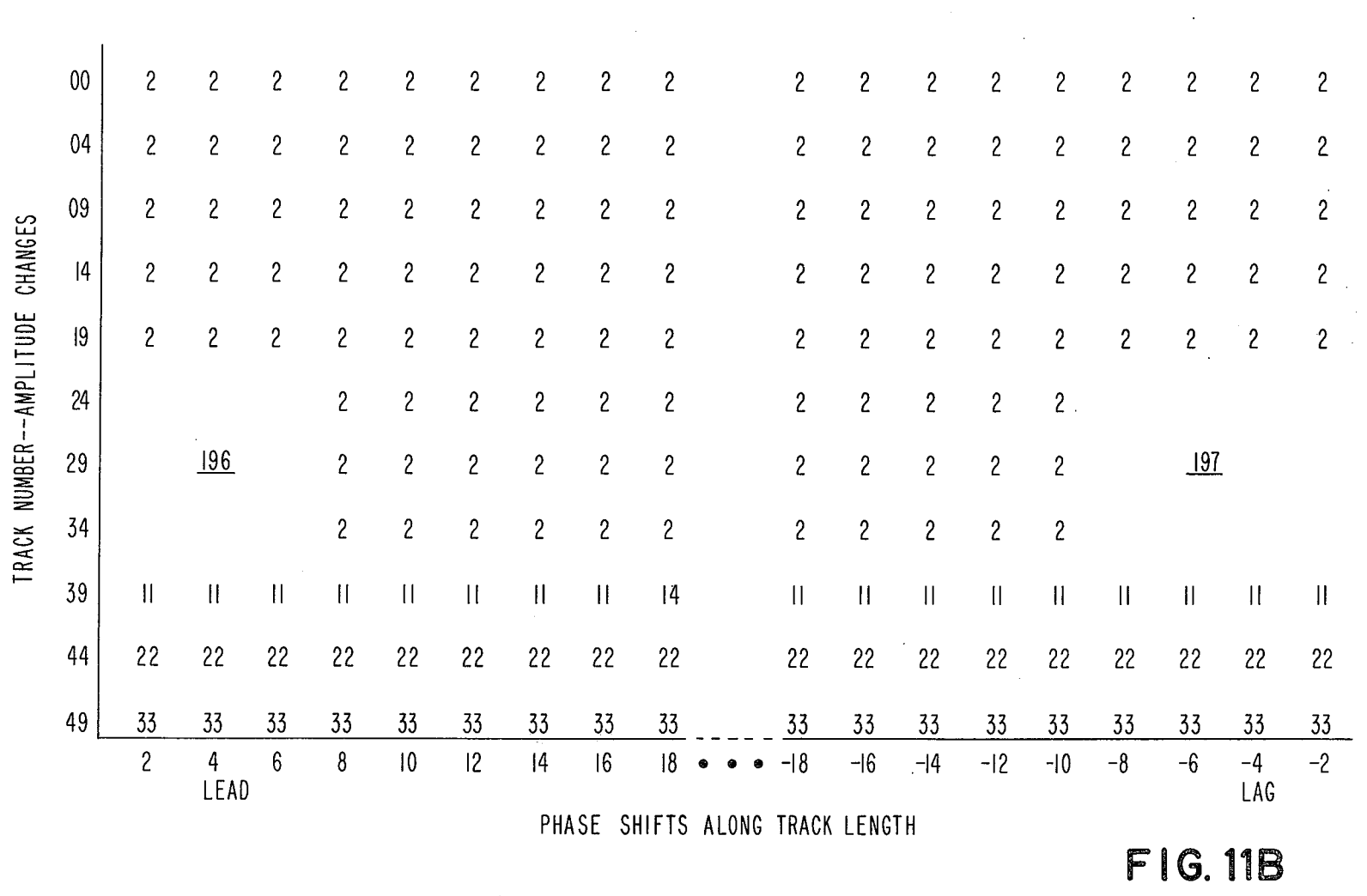

Test section I, an error array for error tests, employs the orthogonally changing dual parameter type of test section for facilitating profiling operation of readback circuits 65 in this regard. Along each of the plurality of tracks in test section I, as shown in FIG. 11, selected phase changes from +2 percent (lead) to +18 percent then −18 percent to −2 percent along the length of each track as tabulated in FIG. 11B. The amplitude of the signals in the respective tracks decrease from a maximum amplitude in track 00, for example, one-half of the maximum desired amplitude of the recorder to a minimum amplitude in track 49. The array printout from the array arranged test section as shown in FIG. 11B with the error conditions again being selected to bracket the boundaries of the printout for circumscribing acceptable readback operations of the helical scan digital signal recorder being tested. The phase shifts in the respective tracks begin with a minimum leading phase shift which should generate a pointer signal as above referred to for test section F. Such leading phase shifts are adjusted toward a maximum phase shift in nine steps from test group 0 to test group 8 along each of the respective tracks. Test group 8 actually is within a detection zone of the bit period of the signal recorded on test section. For example, referring to FIG. 11A, it is seen that each bit period is divided into a detection zone bracketed by a pointer zone. Any signal transition which is phase shifted out of the detection zone into a pointer zone should generate a pointer signal. Accordingly, phase errors occur at the beginning of each track and finally a readback circuit 65 should accommodate the signal at the middle of each of the tracks. The phase shift within detection zone has skipped from test group 8 to test group 9 since no errors are expected in this area. Then a lagging phase shift is continued onward from a maximum lagging to a minimum lagging at the end of each of the tracks. Accordingly, test section I contains phase shifts through the pointer zones for varying amplitudes.

It is to be expected that readback circuits 65 may respond to lowered amplitude phase-shifted signals for producing errors more quickly than for maximum amplitude identically phase-shifted signals. In addition, lowering amplitude also introduces additional phase shifts, as is well known in the art. Hence, the phase shift of test group 00 in track 49 effectively will be greater than the phase shift of track 00 because of such reduced amplitude and resultant addition signal perturbations.

In some readback circuits, pointer signals are combined to provide error location pointers. For example, no pointer signal may be provided unless both amplitude and phase shift errors are detected. Such readback circuits to be tested in accordance with the FIG. 11 illustrated error array would result in the simulated printout shown in FIG. 11B. At the lower numbered tracks, there was sufficient amplitude such that amplitude errors did not occur, even though phase errors did occur. As a result, because of the absence of these error pointer signals, the error correction circuits of readback circuit 65 could not correct the data resulting in two errors per test byte group. That is, the Hinz, Jr. patent and invention could not be employed because of the high amplitude. As the track number was increased and the amplitude decreased, pointer signals were generated which enabled correction. This is represented by the no-print spaces at the bottom edge portions 196, 197 of FIG. 11B. Additionally, the reduced amplitude would result in data errors along the length of the track to such an extent that uncorrectable errors occurred. This is reflected in the higher numbered track printouts such as in tracks 39 to 49. From examining FIG. 11B, it is seen that successful error pointer operation occurs only at reduced amplitude (which is usually the case when there is a phase error) and for lesser phase shifts, i.e., in those portions 196, 197 of the pointer zones bracketing the detection zones. If the phase shift is close to the bit period boundary as in byte test groups 00 and 19, errors still occur.

From the above, it is seen that the orthogonally varied dual parameter array results in precise profiles for analyzing error correction and other circuit operations.

While the invention has been particularly shown and described with reference to a preferred embodiment thereof, it will be understood by those skilled in the art that various changes in form and details may be made therein without departing from the spirit and scope of the invention.

What is claimed is:

1. A test tape for helical scan recorder having an elongate flexible substrate with a magnetic layer for receiving signals, a plurality of recorded helical scan test sections spaced along said tape and said test sections having recorded signals for inducing errors, each said section including helical scan type record tracks, the improvement including in combination:

a first type of said test sections having recorded signals exhibiting measurable head-to-helical track error-inducing characteristics at least one of which relates to a given head-to-tape error inducting condition, and a plurality of said first type test sections in said type including one section adjacent each tape end and another section centrally of the length of said tape.

2. The test tape set forth in claim 1 wherein one of said first type test sections includes signal patterns to facilitate measuring tracking characteristics of a helical scan recorder, said one test section comprising a plurality of longitudinally spaced apart helical scan type record tracks, with the spacing between said tracks being varied in incremental steps along the length of the tape from approximately an expected spacing to a spacing at least equal to the width of said helical type record track along the length of the tape.

3. The test tape set forth in claim 1 wherein one of said test sections includes a plurality of longitudinally spaced apart helical scan type record tracks, each said record track in said one section having a signal pattern repeated throughout its length which is identical to all signal patterns in the tracks and having a predetermined repetitiveness along each said record track in said one section, and a multiplicity of erasure tracks disposed transversely to and dissecting said helical scan type record tracks having said predetermined patterns such that each said helical scan type record track in said one section is divided into a multiplicity of track record portions separated from adjacent track record portions by said erasure tracks.

4. The test tape set forth in claim 3 wherein the said predetermined pattern in said helical scan type record tracks in said one section consist of a squarewave signal with a predetermined number of squarewave transitions disposed between each and every erasure track in each and every one of said helical scan record tracks in said one section.

5. The test tape set forth in claim 4 wherein said erasure tracks are equally spaced apart and have a width narrower than the width of said helical scan record tracks.

6. The article set forth in claim 1 wherein one of said test sections is adapted to measure the head-to-medium spacing, such one test section including in combination:
- a plurality of elongate helical scan one record tracks, each one track having like recorded signals and each with a plurality of head-to-medium spacing test portions for facilitating head-to-medium spacing measurements, each said test portion extending transversely to said one tracks,
- first and second full signal amplitude portions bracketing each said test portion along each of said one track lengths, and
- each said test portion extending transversely to said one tracks and having varying energy contents for inducing errors during readback at a given energy content level for a given head-to-medium spacing such that location of said error indicates the energy content at which said error was induced for indicating head-to-medium spacing.

7. The article set forth in claim 6 wherein said one test section has test portions in each of said plurality of one tracks having a substantially identical energy content, track adjacent one longitudinal end of said one test section having a maximum energy content in its respective test portions, and each adjacent one track toward the opposite longitudinal end of said test section having decreasing energy content in its respective test portions, such that failure location by said one tracks indicates an average head-to-medium spacing along the one track and failures along a given one track indicating profile of head-to-medium spacing along the respective one tracks.

8. The article set forth in claim 1 further including,
- a one test section having longitudinal signal perturbations in a one track for measuring the sensitivity of a digital recorder to such longitudinal signal perturbations,
- the improved test section including in combination:
- such one test section having at least one track for said longitudinal signal recorded wherein at a given frequency, said longitudinal signal having a plurality of phase shift triggers for inducing perturbations in readback circuits read in the article, and immediately adjacent downstream from said phase trigger shift, a test portion having predetermined longitudinally phase shifts, and
- a plurality of such phase shift triggers followed by said longitudinally phase shifts of varying degrees being disposed in said test section for enabling testing of a recorder to such longitudinal signal perturbations preceded by a phase trigger shift.

9. The article set forth in claim 8 wherein said one test section longitudinally extends along the article with a plurality of parallel test tracks, each said parallel test track having a plurality of test portions,
- a one of said parallel test tracks at one longitudinal end of said test section having a plurality of error inducing phase-leading type of signal perturbations, and a second one of said parallel test tracks at a second longitudinal end of such test section having an error inducing phase-lagging type of signal perturbations, and
- said parallel test tracks intermediate said one parallel test tracks having decreasing signal phase shifts to a zero signal shift at a longitudinal center of said section whereby the reading of all of said tracks by a digital signal recorder shall bracket any phase error tolerance of said recorder with respect to the recorded signal phase perturbations.

10. The article set forth in claim 9 wherein said one test portion includes at least one relatively long one-half wavelength, said signal perturbations being in said long one-half wavelength such that the length of said long one-half wavelength varies in length from track-to-track, and
- said first mentioned one track having a maximum length long wavelenths while said second one having a minimum length of said long wavelengths.

11. The test article set forth in claim 9 wherein the number of transitions between said signal perturbations and a phase shift section in a given track increases along the track length.

12. The test article set forth in claim 8 including a plurality of phase test triggers each followed by a like plurality of peak shift test portions separated therefrom by a equal number of transition positions.

13. The test article set forth in claim 8 having plurality of test portions each having a phase test trigger separated from a phase test portion by variable number of transition positions and further having differing phase shifts for each of said given number of transition positions.

14. The test article set forth in claim 1 wherein one of said test sections has a plurality of parallel spaced apart helical scan tracks with a first signal parameter variation along each of said tracks and a second signal parameter variation between said individual tracks, and
- one of said signal parameter variations being phase shift.

15. The test article set forth in claim 14 wherein said plurality of tracks have a gradation of amplitudes beginning from one longitudinal end at a maximum amplitude to a minimum amplitude at an opposite longitudinal end, and all phase shifts being along a given track being substantially identical.

16. A test article for a magnetic recorder consisting of a record member having a magnetic record portion, recorded test indicia consisting of a plurality of longitudinally spaced apart helical scan tracks each having repeated signal patterns and a plurality of spaced apart erasure portions dissecting said helical scan tracks, and extending transversely to the extent of said tracks.

17. The test article set forth in claim 16 wherein said erasure portions are equally spaced apart along the lengths of said tracks.

18. The test article set forth in claim 17 wherein each said erasure portions have a width not greater than the width of each of said helical scan tracks.

19. The test article set forth in claim 17 wherein each said dissected helical scan tracks has alternate erasure and recorded portions of similar extents along the track lengths such as to yield a substantial triangularly-shaped readback signal envelope.

20. The test article set forth in claim 16 wherein each track except for said erasure portions has substantially all recorded equally spaced-apart transitions between oppositely poled magnetic remanence whereby any tests, using the test article, are calibratable to counts of said transitions.

21. The test article set forth in claim 20 wherein said erasure portions extends longitudinally of said test article to dissect said tracks at an angle substantially equal to an angle supplemental to the angle of said tracks with respect to a longitudinally extending edge of said article.

22. For testing readback circuits of a digital signal magnetic recording system, a sheet-like article having a magnetic signal record portion, said record portion having a plurality of substantially parallel elongated signal tracks, each track having a signal with transitions between two magnetic states recorded therein, said tracks extending along a first direction and being spaced along a second direction which is transverse to said first direction, each said recorded signal having bit cells and ideally a fixed phase relationship to said bit cells, the improvement including in combination:

said phase of said signals varying in a predetermined phase change precession along one of said directions, and said signals having a second signal parameter varying in a predetermined change pattern along said second one direction such that combined phase and second parameter relationships exist as a predetermined array in said plurality of tracks.

23. The article set forth in claim 22 wherein said second signal parameter is signal amplitude, and the phase of said signals varying along the lengths of said track with the amplitude in each of said tracks being substantially constant, and the amplitude of the various tracks varying in a predetermined change pattern.

24. The article set forth in claim 22 wherein each of said tracks have a substantially constant signal amplitude which said predetermined change pattern being along said second one direction transversed to the track length, and said signal phase being repeatedly shifted along the length of said tracks with spacing between successive ones said phase shifts along each of side tracks being of a constant number of signal transitions with the spacing between said transitions being varied in said second one direction.

25. For testing readback circuits of a digital signal magnetic recorder, a sheet-like article having a magnetic signal record portion, said portion having a plurality of substantially parallel elongated signal tracks, each track having a signal with transitions between at least two magnetic states recorded therein, said recorded signal having bit cells and ideally a fixed phase relationship to said bit cells, the improved article including in combination:

at least one of said tracks having a test pattern characterized by an initial phase shift, a predetermined number of transitions phase shifted in accordance with said initial phase shift, and additional phase shifted transition having a phase shift substantially different than said initial phase shift whereby digital signal recorders having equalized readback circuits can be phase shift tested.

26. The article set forth in claim 25 wherein said initial phase shift constitutes a phase trigger, and said second mentioned phase shift being a peak shifted replica whereby elongated one-half wavelengths become shorter and adjacent shorter wavelengths become longer such that digital signal recorder can be tested for peak shift sensitivity.

27. A test section for an article used to test digital signal magnetic recorders, the improvement including in combination:

a plurality of elongate record tracks each having like recorded signals and each record track having a plurality of test portions for facilitating measurement of head-to-medium spacing, said test portions aligned transversely to said tracks, first and second full signal amplitude portions bracketing along the track length of each said test portions, and said test portions extending having differing energy contents for inducing errors during readback at a given energy content for a given head-to-medium spacing in accordance with track location of said given energy content test portion on said article.

28. The method of determining spacing between a transducing element and a record member, said record member having recorded signals along a record track in spaced-apart bursts of said signals with each burst having end portions disposed at an angle substantially other than 90° to or aligned with the record track length such that signals in said portions have different widths whereby energy content of said signals in both said portions varies along record track length, including the steps of:

relatively moving said member having said recorded signals and said element over so as to produce readback signals exhibiting a triangulated signal amplitude envelope shape with the triangulated portions corresponding to said end portions, respectively, detecting said readback signals having an amplitude greater than a given threshold amplitude, and measuring distance on said record member between said signals having said given threshold amplitude as a measure of said transducing element to record member spacing.

29. The method set forth in claim 28 wherein said recorded signal has substantially evenly spaced signal transitions along a given direction, the method further including the steps of:

relatively moving said element and said member along said given direction, sensing said recorded signal transitions, and counting the sensed transitions between said thresholds as measure of said transducing element to record member spacing.

30. The method set forth in claim 28 wherein said record member recorded signals are along a track dissected by plural erasures at an angle other than a right angle so as to provide graded energy content in signal portions abutting said erasures, the method further including the steps of:

relatively moving said element and member along said track, sensing said recorded signal intermediate two of said erasures and measuring elapsed time signal exceeds said given threshold between two of said triangulations for ascertaining length of the corresponding recorded signal between two points of said recorded signals as an indicia of transducing element to record member spacing.

31. The method set forth in claim 30 wherein each said track is dissected by a plurality of erasures transversed to said track and are substantially evenly spaced apart along the length of the track, the method further including the steps for generating an element to member spacing profile along the length of the track, sensing said recorded signal portions between each of said erasures substantially along the entire length of said track, and repeating said measurement step for each of said portions to generate indicia of spacing of each portion to yield a spacing profile.

32. The method of measuring transducing element to record member spacing, said record member having a plurality of parallel record tracks each with recorded signals, each track including a plurality of signal test portions of predetermined energy content, said predetermined energy content being a maximum in one of said tracks and of decreasing energy content by predetermined increments in tracks disposed remote from said one track, the method including the steps of:

relatively moving said transducing element along each of said parallel record tracks for sensing recorded signals therein, and detecting signal sensing errors in each said test portions and indicating element to record member spacing in accordance with onset of error detection.

33. The method of testing a signal processing circuit, the steps of:

supplying a signal to said circuit, supplying an initial phase trigger phase shift as a part of said signal to perturb said signal processing circuit, and supplying a second phase disturbance in said signal a predetermined time after said initial phase trigger for testing recovery of said signal processing circuit from said initial phase trigger.

34. The method of testing set forth in claim 33 further including the step of:

varying said predetermined time for a given initial phase trigger phase shift for measuring time of circuit recovery for said given phase shift.

35. The method of testing set forth in claim 33 further including the steps of:

supplying a plurality of initial phase trigger phase shifts of varying phase-shift magnitudes, and for each of said phase-shift magnitudes varying said predetermined time within a given range of elapsed time for measuring response of the circuit to varying phase-shift magnitudes.

36. The method of stressing a helical scan recorder for obtaining data useful for error analysis and calibration, the improved method including the steps of:

sensing a record member in a recorder, said record member having evenly spaced apart signal marks some of which have equally spaced sensible indicia therebetween, said marks being graded in energy content to facilitate variable sensing, establishing a sensing threshold, and counting said equally spaced indicia.

* * * * *